US012746173B2

(12) United States Patent
Gong et al.

(10) Patent No.: US 12,746,173 B2
(45) Date of Patent: Sep. 29, 2026

(54) BRAKE APPARATUS, WHEEL BODY ASSEMBLY AND ROLLATOR

(71) Applicant: ZHEJIANG YIHENGYUE MEDICAL TECHNOLOGY CO., LTD, Taizhou (CN)

(72) Inventors: Mao Gong, Guangzhou (CN); Yong Li, Guangzhou (CN)

(73) Assignee: ZHEJIANG YIHENGYUE MEDICAL TECHNOLOGY CO., LTD, Taizhou (CN)

(*) Notice: Subject to any disclaimer, the term of this patent is extended or adjusted under 35 U.S.C. 154(b) by 347 days.

(21) Appl. No.: 18/414,897

(22) Filed: Jan. 17, 2024

(65) Prior Publication Data

US 2024/0148598 A1 May 9, 2024

Related U.S. Application Data

(63) Continuation of application No. PCT/CN2021/127110, filed on Oct. 28, 2021.

(30) Foreign Application Priority Data

Aug. 13, 2021 (CN) ........................ 202110933026.1

(51) Int. Cl.

| | |
|---|---|
| ***A61H 3/04*** | (2006.01) |
| ***B60T 1/06*** | (2006.01) |
| ***H02K 49/06*** | (2006.01) |
| *B62B 5/04* | (2006.01) |

(52) U.S. Cl.

CPC .................. *A61H 3/04* (2013.01); *B60T 1/06* (2013.01); *H02K 49/065* (2013.01); *A61H 2003/046* (2013.01)

(58) Field of Classification Search

CPC ................................ A61H 3/04; B62B 5/0404

See application file for complete search history.

(56) References Cited

U.S. PATENT DOCUMENTS

| | | | | |
|---|---|---|---|---|
| 2017/0361649 A1* | 12/2017 | Lin | ........................ | B60B 3/082 |
| 2023/0270617 A1* | 8/2023 | Ham | ........................ | B60B 19/00 |
| 2023/0271448 A1* | 8/2023 | Ham | ........................ | A61H 3/04 |

FOREIGN PATENT DOCUMENTS

| | | |
|---|---|---|
| CN | 107303235 A | 10/2017 |
| JP | H0471360 A | 3/1992 |

* cited by examiner

*Primary Examiner* — Tan Q Nguyen

(74) *Attorney, Agent, or Firm* — Westbridge IP LLC

(57) ABSTRACT

Disclosed are a brake apparatus, a wheel body assembly, and a rollator. The brake apparatus comprises a shaft body, a housing, a magnetic induction mechanism and an adjustment mechanism. The housing rotates relative to the shaft body; the magnetic induction mechanism is arranged in the housing to generate resisting force opposite to a rotation direction of the housing or the shaft body to the housing or the shaft body by a magnetic field reaction when the housing rotating relative to the shaft body. The adjustment mechanism is connected to the magnetic induction mechanism for adjusting a magnitude of the resisting force. The magnetic induction mechanism is capable of playing a braking role on the wheel body integrated or connected with the brake apparatus, because its braking force is related to the rotation of the housing or shaft body, rather than friction braking, it will not produce an emergency stop effect.

19 Claims, 26 Drawing Sheets

BRAKE APPARATUS, WHEEL BODY ASSEMBLY AND ROLLATOR

CROSS-REFERENCE TO RELATED APPLICATIONS

This application is a continuation of International Application No. PCT/CN2021/127110, filed on Oct. 28, 2021, which claims priority to Chinese Patent Application No. 202110933026.1, filed on Aug. 13, 2021. All of the aforementioned applications are incorporated herein by reference in their entireties.

TECHNICAL FIELD

The present disclosure relates to the technical field of medical devices, in particular to a brake apparatus, a wheel body assembly and a rollator.

BACKGROUND

Assistive walking devices such as rollator can assist people with mobility problems such as lower limb lesions or the elderly to walk. For example, the rollator can be a support frame, the user can hold the support frame with both hands, and when walking, the user can lift the support frame to move, in order to achieve the purpose of moving the body.

The applicant of the present disclosure has found in the long-term research and development that users need to constantly lift the support frame during walking, which is a large burden, slow moving speed and inconvenient use. At present, wheels are set at the bottom of the support frame to increase its flexibility, but the support force and speed provided to users during movement are uncontrollable, which may easily cause users to fall and have poor safety. If braking is carried out through the brake apparatus, the operation requirements of the user are higher, and the emergency stop of the brake is also dangerous.

SUMMARY

The present disclosure provides a brake apparatus, a wheel body assembly, and a rollator to solve the technical problem of the prior art of providing wheels on devices such as rollator resulting in poor safety.

In order to solve the above-mentioned technical problems, an embodiment of the present disclosure provides a brake apparatus, comprising:

- a shaft body;
- a housing, sleeved outside the shaft body and configured coaxially with the shaft body, the housing being rotatable relative to the shaft body;
- a magnetic induction mechanism, arranged in the housing to generate resisting force opposite to a rotation direction of the housing to the housing or generate resisting force opposite to a rotation direction of the shaft body to the shaft body by a magnetic field reaction when the housing rotating relative to the shaft body; and
- an adjustment mechanism, connected to the magnetic induction mechanism for adjusting a magnitude of the resisting force.

In order to solve the above-mentioned technical problems, another embodiment of the present disclosure provides a wheel body assembly, comprising:

- the brake apparatus as described above, where the housing is provided in a circular shape for use as a wheel body; or

- the brake apparatus and the wheel body as described above, the wheel body is connected to the housing or the shaft body.

In order to solve the above-mentioned technical problems, further another embodiment of the present disclosure provides a rollator, comprising a main frame and the wheel body assembly as described above, the wheel body assembly is rotatably connected to a bottom of the main frame.

The brake apparatus of the present disclosure comprises a shaft body, a housing, a magnetic induction mechanism and an adjustment mechanism, the housing sleeved outside the shaft body and configured coaxially with the shaft body, the housing is rotatable relative to the shaft body, the magnetic induction mechanism, is arranged in the housing to generate resisting force opposite to a rotation direction of the housing to the housing or generate resisting force opposite to a rotation direction of the shaft body to the shaft body by a magnetic field reaction when the housing rotating relative to the shaft body; the adjustment mechanism is connected to the magnetic induction mechanism for adjusting a magnitude of the resisting force.

By setting the magnetic induction mechanism to generate resisting force, it can play a braking role on the wheel body integrated or connected with the brake apparatus, and because its braking force is related to the rotation of the housing or shaft body, rather than friction braking, it will not produce an emergency stop effect, which is safer and also can reduce wear and improve the service life of the brake apparatus, meanwhile the brake apparatus is simple in structure and easy to prepare. By setting the adjustment mechanism to automatically adjust resisting force, the brake apparatus can be applied to a wider range, and more intelligent.

BRIEF DESCRIPTION OF THE DRAWINGS

In order to illustrate the embodiments of the present disclosure more clearly, below is a brief introduction of the accompanying drawings required for the description of the embodiments of the present disclosure. It is evident that the accompanying drawings in the following description are only some embodiments of the present disclosure. It will be appreciated by those skilled in the art that other drawings can be obtained based on these drawings without any creative effort.

DETAILED DESCRIPTION OF THE EMBODIMENTS

Figure 1:
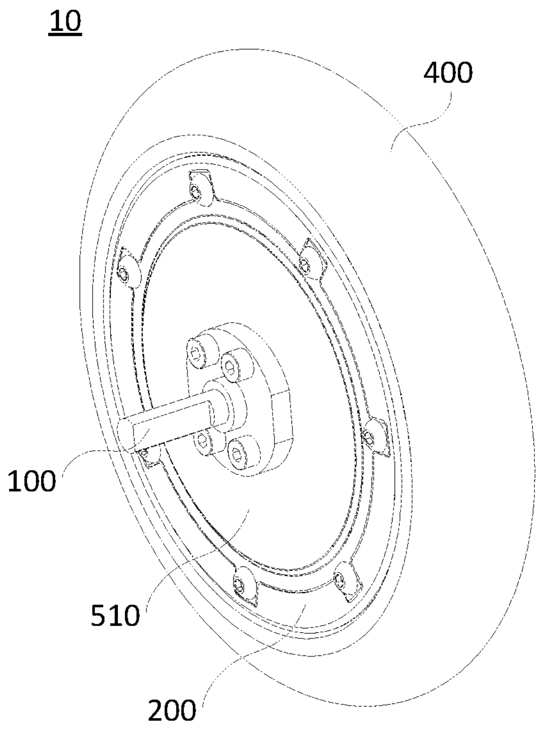
FIGS. 1-5 are schematic structural views of a brake apparatus according to a first embodiment of the present disclosure.

The following will be a clear and complete description of the technical solutions in the embodiments of the present disclosure in conjunction with the accompanying drawings in the embodiments of the present disclosure. It will be appreciated that the described embodiments are only a part of the embodiments of the present disclosure, rather than all the embodiments. Based on the embodiments described in the present disclosure, those skilled in the art can obtain all other embodiments without creative work, which are all within the protection scope of the present disclosure.

The terms "first" and "second" in the present disclosure are used only for descriptive purposes and are not to be appreciated as indicating or implying relative importance or implicitly indicating the number of technical characteristics indicated. In the description of the present disclosure, "multiple" means at least two, e.g., two, three, etc., unless specifically specified otherwise. Furthermore, the terms "comprise" and "include" and any variation thereof, are intended to cover non-exclusive inclusion. For example, process, method, system, product, or equipment that consists of a series of steps or units is not restricted to listed steps or units, but optionally includes steps or units that are not listed, or optionally includes additional steps or units that are inherent to these processes, methods, products, or equipment. However, the term "and/or" is simply a description of the associated relationship of the associated objects, indicating that three relationships can exist. For example, A and/or B, which can mean three presences of A alone, both A and B, and B alone. In addition, the character "I" in the present disclosure generally means that the associated objects are a kind of "or" relationship.

Referring to FIGS. 1 to 4, the first embodiment of the brake apparatus 10 of the present disclosure comprises a shaft body 100, a housing 200, a magnetic inductor 310 and a magnet assembly 320, the housing 200 sleeved outside the shaft body 100 and configured coaxially with the shaft body 100, the housing 200 is rotatable relative to the shaft body 100, the magnetic inductor 310 is provided with coils 311 wound thereon, the magnet assembly 320 including a plurality of magnets spaced along the circumferential direction of the shaft body 100. One of the magnetic inductor 310 or the magnet assembly 320 is connected to the shaft body 100 and another one is connected to the housing 200, so that when the housing 200 rotates relative to the shaft body 100, the coils 311 are capable of cutting the magnetic field formed by the magnet assembly 320, thereby generating resisting force opposite to a rotation direction of the housing 200 or the shaft body 100, which can play a braking role on the brake apparatus 10, and because its braking force is related to the rotation of the housing 200 or the shaft body 100, rather than friction braking, it will not produce an emergency stop effect, which is safer and also can reduce wear and improve the service life of the brake apparatus 10, meanwhile its structure is simple and easy to prepare.

In this embodiment, the brake apparatus 10 may further include a tire 400. The tire 400 is sleeved outside the housing 200 and can have the effect of shock absorption.

Figure 5:
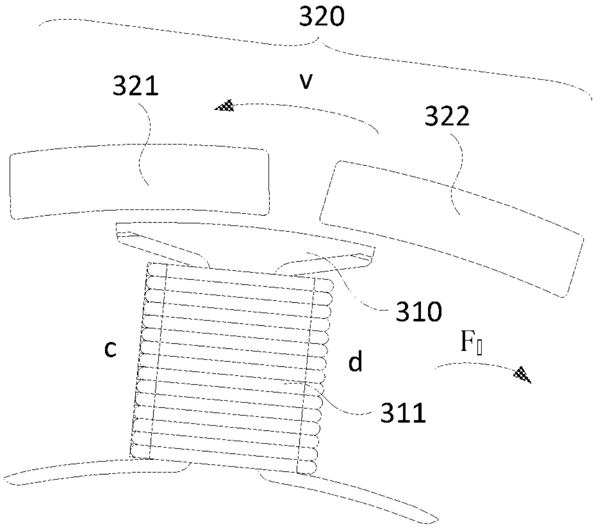

Specifically, referring to FIG. 5, the magnet may include a first magnet 321 and a second magnet 322. In this embodiment, the first magnet 321 and the second magnet 322 are taken as examples for illustration. As shown in FIG. 5, the magnet assembly 320 rotates counterclockwise with speed v, and the magnetic inductor 310 is fixed. The magnetic field intensity generated by the first magnet 321 and the second magnet 322 are B1 and B2 respectively. The magnetic pole of the first magnet 321 toward the magnetic inductor 310 is the north pole, and the magnetic pole of the second magnet 322 toward the magnetic inductor 310 is the south pole. The portions of the coils 311 cutting the magnetic induction lines are c-side portion and d-side portion. The projection length (i.e., the length of the c-side portion or the d-side portion along the axis direction of the shaft body 100) of the coils 311 in the direction of cutting the magnetic induction lines (i.e., the circumferential direction of the shaft body 100) is L. As shown in FIG. 5, the direction of the induced current generated by the c-side portion is the forward direction, and the direction of the induced current generated by the d-side portion is the backward direction. Then, the amperage force generated by the c-side portion is $Fc=nB1Lv$, and the amperage force generated by the d-side portion is $Fd=nB2Lv$, where n is the number of turns of the coils 311. Since the direction of amperage forces of the two is clockwise, the resultant force of the two is $Ftotal=nB1Lv+nB2Lv$, and since the magnetic field intensity generated by the first magnet 321 and the second magnet 322 is equal, i.e. $B1=B2=B$, so $Ftotal=2*nBLv$.

In this embodiment, the resisting force is positively related to the rotation speed of the housing 200 or the shaft body 100, which can also be derived from $Ftotal=2*nBLv$, i.e., the greater the rotation speed of the housing 200, the greater the resisting force generated by the magnetic field formed by the coils 311 cutting the magnet assembly 320 opposite to the rotation direction of the housing 200, which can provide constant braking force and better stability when the rotation speed of the brake apparatus 10 is constant, and can provide greater braking force when the rotation speed of the brake apparatus 10 becomes faster, thus preventing the brake apparatus 10 from moving too fast and improving safety.

In this embodiment, the number of the magnets is even, and the plurality of magnets are symmetrically provided with respect to the axis center of the shaft body 100, which can make the distribution of the magnetic field formed by the magnet assembly 320 more uniform, and thus make the resisting force generated by the magnetic field formed by the coils 311 cutting the magnet assembly 320 more stable.

In this embodiment, the poles of the two magnets symmetrical to the axis center 100 are set in the same direction, and the poles of the two adjacent magnets are set in the opposite direction. The installation directions of the magnetic poles of the magnets are defined toward and away from the axis center of the shaft body 100. The poles of the two magnets are set in the same direction means the poles of both magnets are set toward or away from the axis center of the shaft body 100, and the poles of the two magnets are set in the opposite direction means the pole of one of the two magnets is set toward the axis center of the shaft body 100 and the pole of another one is set away from the axis center of the shaft body 100. The above way of setting the magnets enables the magnetic field formed by the magnet assembly 320 to be distributed more evenly, which in turn makes the resisting force generated by the magnetic field formed by the coil 311*s* cutting the magnet assembly 320 more stable.

In this embodiment, the magnetic inductor 310 includes a main portion 312 and a plurality of mounting portions 313 spaced along the outer circumference of the main portion 312, and the coils 311 are wound on the mounting portions 313, which can make the relative position of the coils 311 to the magnetic inductor 310 more stable.

In this embodiment, the mounting portions 313 may be provided in I-shaped to facilitate winding of the coils 311 and to limit the coils 311 to prevent the coils 311 from falling off from the mounting portions 313 in the direction away from the shaft body 100, making the overall structure of the coils 311 and the magnetic inductor 310 more stable.

In other embodiments, the mounting portions 313 may also be provided in linear shape to enable winding of the coils 311, without limitation herein.

In this embodiment, the maximum width of the coils 311 on the mounting portions 313 along the circumferential direction of the shaft body 100 is equal to the width of the magnets along the circumferential direction of the shaft body 100, and the maximum length of the coils 311 on the mounting portions 313 along the axis direction of the shaft body 100 is greater than or equal to the length of the magnets along the axis direction of the shaft body 100, to enable the coils 311 to continuously cut the magnetic field formed by the magnet assembly 320 during movement relative to the magnets, thereby continuously generating resisting force, resulting in better stability of the resisting force.

In other embodiments, the maximum width of the coils 311 on the mounting portions 313 along the circumferential direction of the shaft body 100 may also be greater than the width of the magnets along the circumferential direction of the shaft body 100, without limitation herein.

In this embodiment, the difference between the maximum width of the coils 311 on the mounting portions 313 along the circumferential direction of the shaft body 100 and the width of the magnets along the circumferential direction of the shaft body 100 is a, and the width of the magnets along the circumferential direction of the shaft body 100 is b, where the ratio of a to b is less than or equal to 10%, such as 10%, 8%, or 5%. When a is 0, the coils 311 are able to continuously cut the magnetic field formed by the magnet assembly 320 during the movement relative to the magnets; when a is greater than 0, both sides of the coils 311 will be in the area corresponding to the same magnetic poles at the same time for a certain period of time, and the current generated on the coils 311 is 0 and the resisting force is interrupted.

In this embodiment, the number of the magnets is greater than the number of the mounting portions 313, and the difference between the number of the magnets and the number of the mounting portions 313 is a positive integer, which can make the magnetic field generated by the magnets continue to act on the coils 311 without interruption, thus continuously generating resisting force and making resisting force more stable.

In this embodiment, all of the coils 311 on the plurality of mounting portions 313 collectively form a closed loop circuit. Specifically, all the coils 311 may be short circuited without connected to other devices. In other embodiments, external devices such as switches, resistors, etc. may also be connected, but the closed loop circuit in this embodiment does not include devices such as drivers, i.e., the current generated by the coils 311 in this embodiment is used only or primarily for generating amperage.

In other embodiments, it is also possible to form a closed loop circuit for the coils 311 on each of the plurality of mounting portions 313, or to collectively form a closed loop circuit for the coils 311 on every at least two of the plurality of mounting portions 313, without limitation herein.

In this embodiment, the housing 200 forms an accommodating space that is provided with an opening (not shown in the figures) on one side of the housing 200. The magnetic inductor 310 and the magnet assembly 320 are set inside the accommodating space. The brake apparatus 10 further includes a cover plate 510 that covers the opening to protect the magnetic inductor 310 and the magnet assembly 320 and other components, making the appearance of the brake apparatus 10 more regular.

In this embodiment, the connection between the cover plate 510 and the shaft body 100, and the connection between the cover plate 510 and the housing 200, can be fixedly connected by screws, respectively. In other embodiments, the cover plate 510 and the housing 200 can also be connected by snap, welding or paste, etc., without limitation herein.

In this embodiment, the brake apparatus 10 may further include a first bearing 520 and a second bearing 530. The first bearing 520 is arranged between the shaft body 100 and the housing 200, and the second bearing 530 is arranged between the shaft body 100 and the cover plate 510. By setting the first bearing 520 and the second bearing 530, it can not only reduce the friction between the shaft body 100 and the housing 200, and the friction between the shaft body 100 and the cover plate 510, but also support the shaft body 100, and extend the service life of the shaft body 100, the housing 200 and the cover plate 510.

Figure 6:
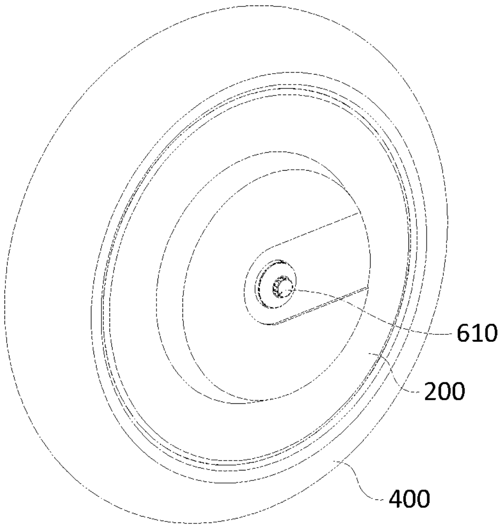
FIGS. 6-14 are schematic structural views of a brake apparatus according to a second embodiment of the present disclosure.
Figure 7:
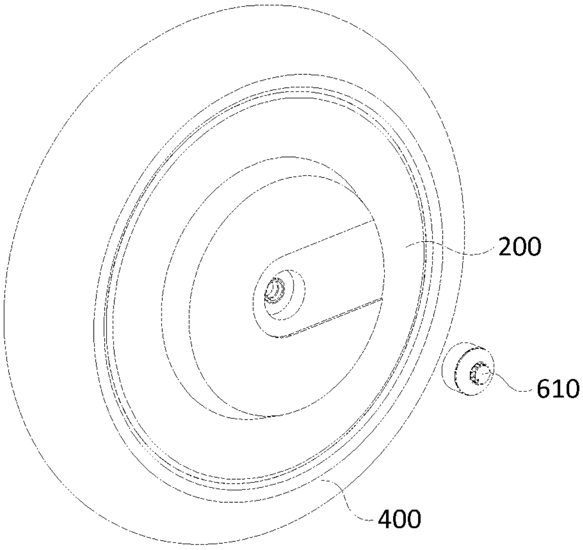
Figure 8:
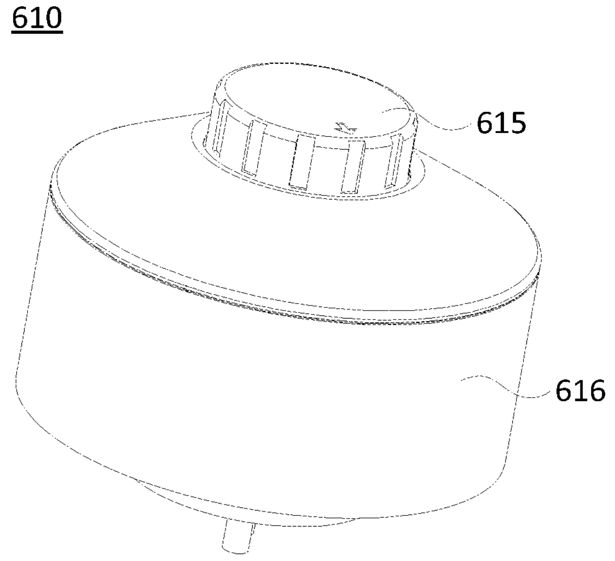
Figure 9:
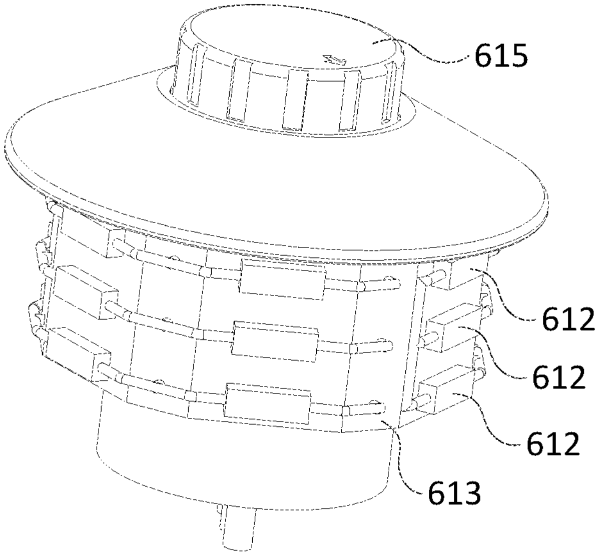
Figure 10:
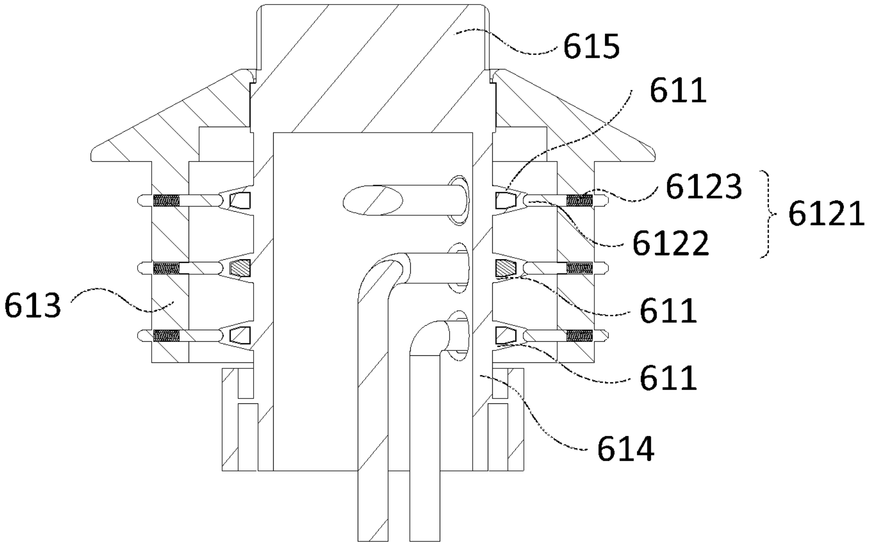
Figure 11:
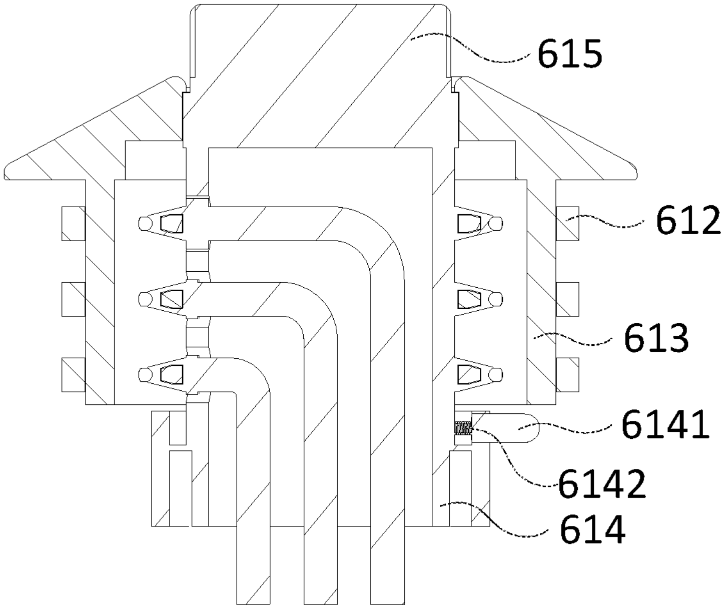
Figure 12:
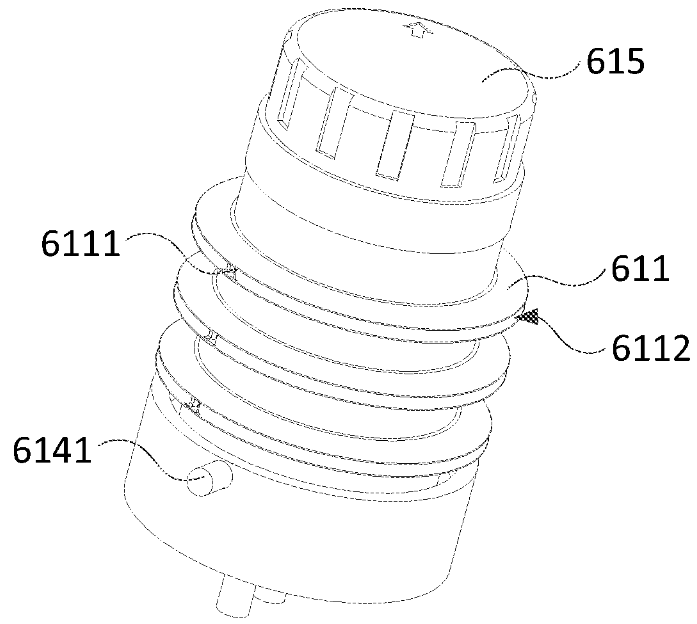

Referring to FIGS. 1, 6 and 7, the second embodiment of the brake apparatus 10 of the present disclosure includes a shaft body 100, a housing 200, a magnetic induction mechanism 300 and an adjustment mechanism 610. The magnetic induction mechanism 300 is arranged in the housing 200 to generate resisting force opposite to a rotation direction of the housing 200 to the housing 200 by a magnetic field reaction when the housing 200 rotating, or generate resisting force opposite to a rotation direction of the shaft body 100 to the shaft body 100. The adjustment mechanism 610 is connected to the magnetic induction mechanism 300 for adjusting the magnitude of the resisting force. The magnetic induction mechanism 300 includes a magnetic inductor 310 and a magnet assembly 320, and the structure of the shaft body 100, the housing 200, the magnetic inductor 310 and the magnet assembly 320 is described in the first embodiment of the brake apparatus 10 above, which will not be repeated herein. By setting the adjustment mechanism 610 to automatically adjust resisting force, the brake apparatus 10 can be applied to a wider range, and more intelligent.

Referring to FIGS. 8 to 12, in this embodiment, the adjustment mechanism 610 includes an adjustment member 611 and at least one resistor 612. The adjustment member 611 is electrically connected with the magnetic induction mechanism 300 and is provided with a first connection portion 6111, and both ends of the at least one resistor 612 are respectively provided with at least two second connection portions 6121. The adjustment member 611 can move relative to the resistor 612, so that the first connection portion 6111 can be electrically connected with at least one of the two second connection portions 6121, and then the magnetic induction mechanism 300 can be connected to a load with different resistance values to achieve the adjustment of resisting force.

In this embodiment, the brake apparatus 10 may further include a first support pipe 613. The at least one resistor 612 is arranged on the first support pipe 613. The adjustment member 611 is provided in a ring shape and can rotate relative to the first support pipe 613. The first connection portion 6111 is a groove formed on the outer circumference of the adjustment member 611. The outer circumference surface of the adjustment member 611 is insulated except the groove. The groove is provided for electric conducting. The second connection portion 6121 includes an abutting portion 6122 and a first elastic member 6123. The abutting portion 6122 is electrically connected with the resistor 612. The first elastic member 6123 is used to provide elasticity to the abutting portion 6122, so that the abutting portion 6122 abuts the outer circumference of the adjustment member 611, and when the first connection portion 6111 rotates opposite to the second connection portion 6121, the abutting portion 6122 can abut against the first connection portion 6111, thus enabling the abutting portion 6122 to be electrically connected to the first connection portion 6111.

In this embodiment, an annular groove 6112 is formed on the outer circumference of the adjustment member 611. The first connection portion 6111 is invaginated relative to the annular groove 6112, and the end of the abutting portion 6122 is provided in an arc-shaped projection, so that at least part of the abutting portion 6122 is embedded in the annular groove 6112, which can realize the restriction of the abutting portion 6122 along the axis direction of the first support pipe 613, preventing the abutting portion 6122 from separating from the adjustment member 611 and improving the reliability of the brake apparatus 10.

In this embodiment, the brake apparatus 10 may further include a second support pipe 614 and a knob 615 connected with the second support pipe 614. The second support pipe 614 is embedded and sleeved in the first support pipe 613, and the adjustment member 611 is arranged on the second support pipe 614, so that the adjustment member 611 can rotate with the knob 615, so that the knob 615 can be rotated by force and then drive the adjustment member 611 to rotate to achieve adjustment. By setting the knob 615 to achieve the adjustment of the adjustment mechanism 610, it can make the adjustment operation more convenient, and the knob 615 occupies less space, making the overall structure of the adjustment mechanism 610 more compact.

Figure 13:
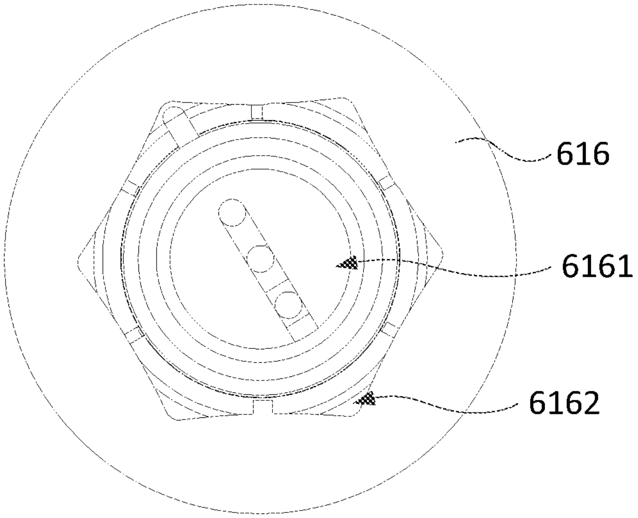

Referring to FIG. 13, in this embodiment, the brake apparatus 10 may further include a shell 616. The adjustment member 611 and the resistor 612 are arranged inside the shell 616. An opening 6161 is formed at one end of the shell 616 away from the knob 165, the opening 6161 is polygonal in shape. The second support pipe 614 is provided with a limit member 6141 and a second elastic member 6142 at one end away from the knob 615. The second elastic member 6142 is used to provide elasticity to the limit member 6141, so that the limit member 6141 can abut against the shell 616 during the rotation of the second support pipe 614.

Specifically, in this embodiment, the opening 6161 includes a plurality of accommodating ports 6162 spaced along the circumferential direction of the first support pipe 613. When the limit member 6141 rotates to the accommodating port 6162, the compression distance of the second elastic member 6142 is 0, so that the limit member 6141 is separated from the shell 616, or the limit member 6141 abuts against the shell 616, but the force acting on the shell 616 is 0, and meanwhile the first connection portion 6111 abuts against one of the second connection portions 6121; when the limit member 6141 rotates between the two accommodating ports 6162, the limit member 6141 abuts against the shell 616, but the force acting on the shell 616 is greater than 0, and meanwhile the first connection portion 6111 does not abuts against one of the second connection portions 6121, so that the user can perceive whether the knob 615 has been rotated to a predetermined gear during the process the process of rotating knob 615.

In other embodiments, the adjustment member 611 may also be a slideway provided in a straight line shape or curved shape, and the adjustment member 611 may slide relative to the resistor 612 to enable the second connection portions 6121 to be electrically connected to the first connection portion 6111.

In this embodiment, the number of resistor 612 is multiple, and multiple resistors 612 form multiple resistor groups. Each resistor group includes at least one resistor 612. Multiple resistor groups are spaced along the axis direction of the first support pipe 613. The number of adjustment member 611 is multiple, which is the same as the number of resistor groups. The multiple adjustment members 611 are spaced along the axis direction of the first support pipe 613, corresponding to the resistor groups one by one respectively, which can access more loads with different resistance values for the magnetic induction mechanism 300, thus making the adjustment of resisting force more flexible, which has wider range and better adaptability.

Figure 14:
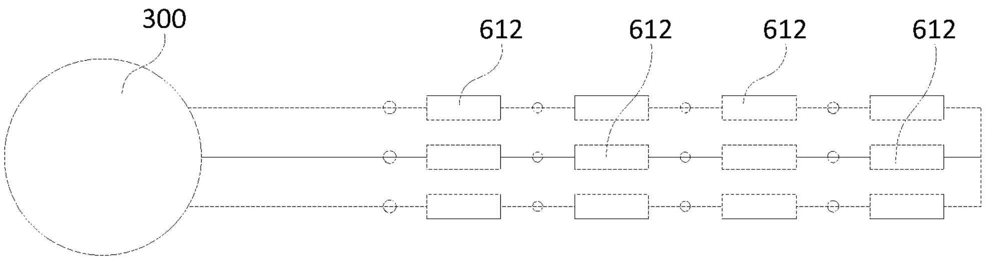
Figure 15:
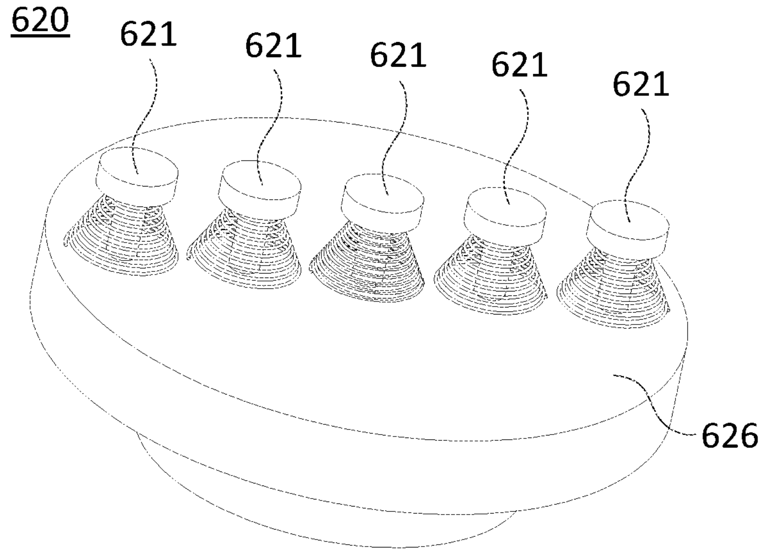
FIGS. 15-21 are schematic structural views of a brake apparatus according to a third embodiment of the present disclosure.
Figure 16:
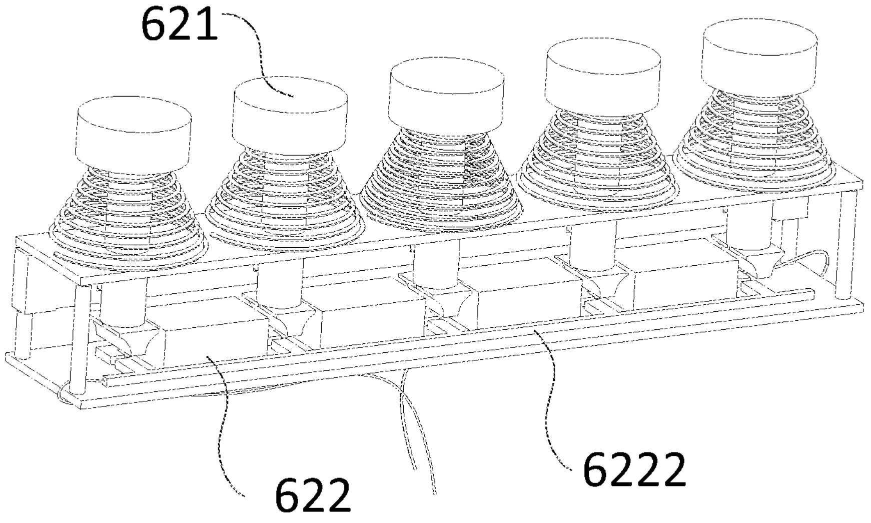
Figure 17:
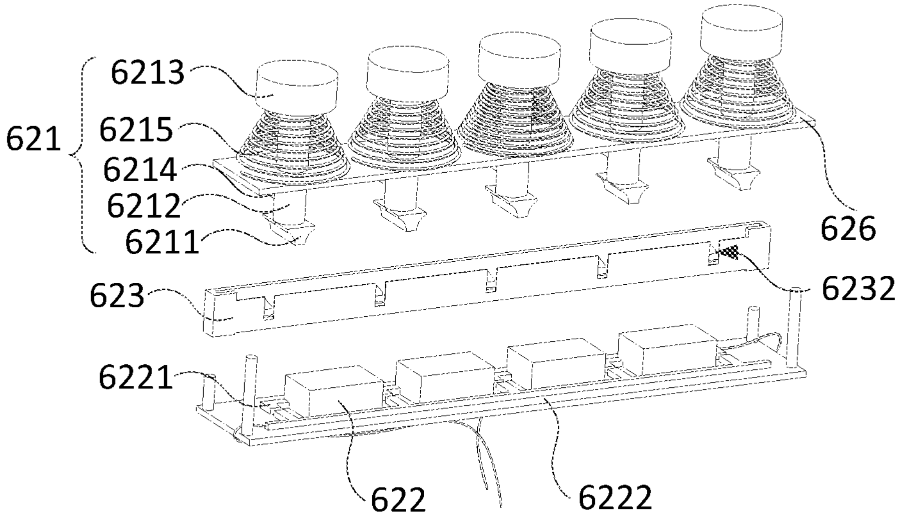

Referring to FIG. 14, for example, in this embodiment, the number of resistor group is three, which are connected with the three wires of the magnetic induction mechanism 300 respectively. Each resistor group includes four resistors 612, which are located on the same plane perpendicular to the axis direction of the first support pipe 613. Four resistors 612 in each resistor group are connected in series. One end of the three resistor groups is connected to each other. The second connection portions 6121 are arranged between each resistor 612 and another end of the resistor group, corresponding to multiple gears. For example, the first gear can access three resistors 612, the second gear can access six resistors 612, etc.

In other embodiments, the magnetic induction mechanism 300 may also directly lead out two wires to connect with the adjustment mechanism 610, or the magnetic induction mechanism 300 may also lead out two or three wires to connect with the adjustment mechanism 610 by two wires after passing through the rectification mechanism (not shown in the figures), without limitation herein.

Referring to FIG. 1, FIG. 15 to FIG. 17, the third embodiment of the brake apparatus 10 in the present disclosure includes a shaft body 100, a housing 200, a magnetic induction mechanism 300 and an adjustment mechanism 620. The structure of the shaft body 100, the housing 200 and the magnetic induction mechanism 300 is described in the second embodiment of the brake apparatus 10 above, which will not be repeated here. The adjustment mechanism

620 is connected with the magnetic induction mechanism 300 for adjusting the magnitude of resisting force.

In this embodiment, the adjustment mechanism 620 includes an adjustment member and at least one resistor 622. The adjustment member includes at least one key 621, which is provided with a guiding connection portion 6211. The brake apparatus 10 further includes a first connection portion 6221 and a second connection portion 6222 provided at intervals. The first connection portion 6221 is electrically connected to one end of the magnetic induction mechanism 300 by the resistor 622, and the second connection portion 6222 is electrically connected to another end of the magnetic induction mechanism 300. The key 621 can be pressed to make the guiding connection portion 6211 conduct the first connection portion 6221 to the second connection portion 6222, and then the corresponding resistor 622 can be connected to the magnetic induction mechanism 300 as a load to realize the change of resisting force. By setting the key 621 to realize the adjustment of the adjustment mechanism 620, it can make the touch of adjustment more obvious and the gear adjustment more reliable.

In other embodiments, one end of the resistor 622 can be connected to one end of the magnetic induction mechanism 300 via the first connection portion 6221, and another end of the resistor 622 is connected to another end of the magnetic induction mechanism 300 via the second connection portion 6222. The key 621 can be pressed to make the guiding connection portion 6211 conduct the first connection portion 6221 to the second connection portion 6222, which in turn the resistor 622 can be short circuited to achieve a change in the load connected to the magnetic induction mechanism 300, thereby achieving the change of resisting force.

In this embodiment, the adjustment member includes at least two keys 621, which are provided with a guiding connection portion 6211. The number of the first connection portion 6221 and the second connection portion 6222 is at least two. The two first connection portions 6221 are connected to the two ends of the at least one resistor 622 respectively, so that when one of the at least two keys 621 is pressed, the guiding connection portion 6211 can make one of the at least two first connection portions 6221 conduct to the second connection portion 6222, and then the corresponding resistor 622 can be connected to the magnetic induction mechanism 300 as a load to achieve the change of resisting force.

In this embodiment, the at least two keys 621 may be spaced along a straight line. In other embodiments, the at least two keys 621 may also be aligned along a curve or other linear shape, without limitation herein.

Figure 18:
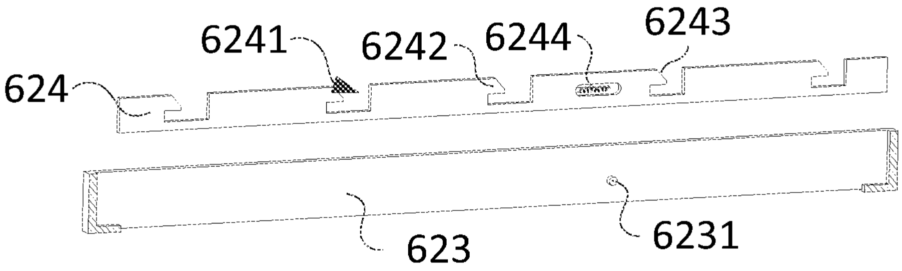
Figure 19:
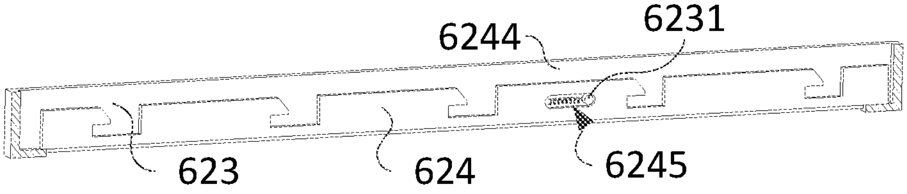

Referring to FIG. 18 and FIG. 19, in this embodiment, the adjustment mechanism 620 may further include a rebound assembly, which can act on the at least two keys 621 respectively, so that when one of the at least two keys 621 is pressed, another key 621 can be popped up, thus making the number of resistor 622 accessed correspond to the gear, and there will be no interference between the gears, and the circuit will not be prone to short-circuit phenomenon, which is more reliable and safe.

Figure 23:
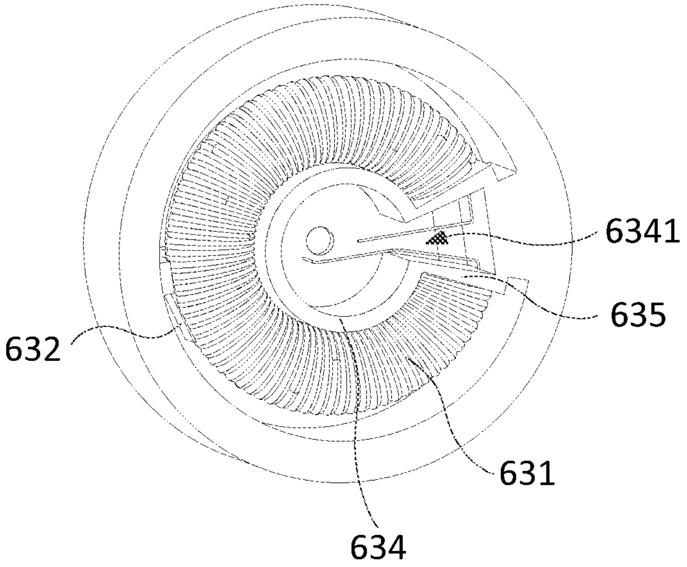
Figure 24:
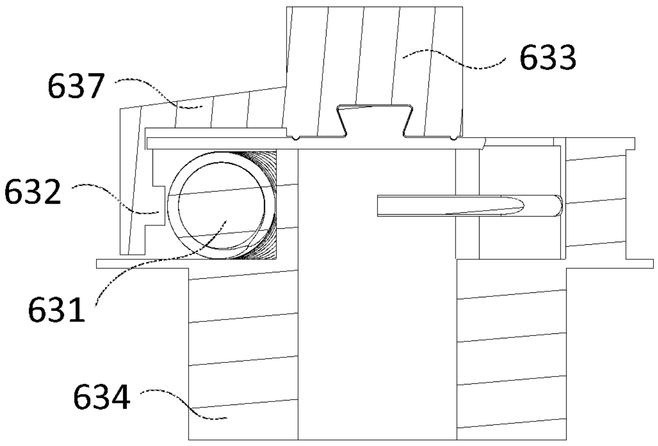

In this embodiment, the key 621 includes a key body 6212 and a button 6213 arranged at one end of the key body 6212, and the guiding connection portion 6211 is arranged at another end of the key body 6212. The rebound assembly may include a carrying plate 623 and a first limit plate 624. The first limit plate 624 is provided with a first limit slot 6241 which is inverted L-shaped or similar inverted L-shaped. The first limit plate 624 includes a limit portion 6242 corresponding to the first limit slot 6241. A first elastic member 6244 is provided between the carrying plate 623 and the first limit plate 624. A limit block 6214 is also provided on the key body 6212, and a second elastic member 6215 is sleeved on the outside of the key body 6212. Specifically, when the key 621 is not pressed, the limit block 6214 is located above the limit portion 6242; during the process of the key 621 being pressed, the second elastic member 6215 is compressed to produce deformation, and the limit block 6214 acts on the limit portion 6242, causing the first elastic member 6244 to produce deformation, and the first limit plate 624 slides relative to the carrying plate 623 (e.g., sliding to the left in FIG. 23), so that the limit block 6214 can extend into the first limit slot 6241, and after the first limit plate 624 reaches the bottom of the first limit slot 6241, the first limit plate 624 slides relative to the carrying plate 623 under the action of the first elastic member 6244 (e.g., sliding to the right in FIG. 23), and the limit block 6214 is restricted below the limit portion 6242; when another key 621 is pressed, the first limit plate 624 slides again relative to the carrying plate 623 (e.g., sliding to the left in FIG. 23), and the limit block 6214 of the key 621 restricted is released from the corresponding limit portion 6242, and the key 621 is able to spring back under the action of the second elastic member 6215.

In this embodiment, the first limit plate 624 is provided with an inclined surface 6243 corresponding to the first limit slot 6241. The inclined surface 6243 can be used to guide the limit block 6214 to facilitate the limit block 6214 to slide downwards along the inclined surface 6243 to snap into the first limit slot 6241, which can make the process of pressing the key 621 smoother.

In this embodiment, an accommodating slot 6245 is also provided on the first limit plate 624, and an abutting column 6231 is provided on the carrying plate 623. The first elastic member 6244 and the abutting column 6231 are both placed in the accommodating slot 6245, and the abutting column 6231 is used to abutting against the first elastic member 6244 to make the structure and position of the first elastic member 6244 more stable during compressions.

Figure 20:
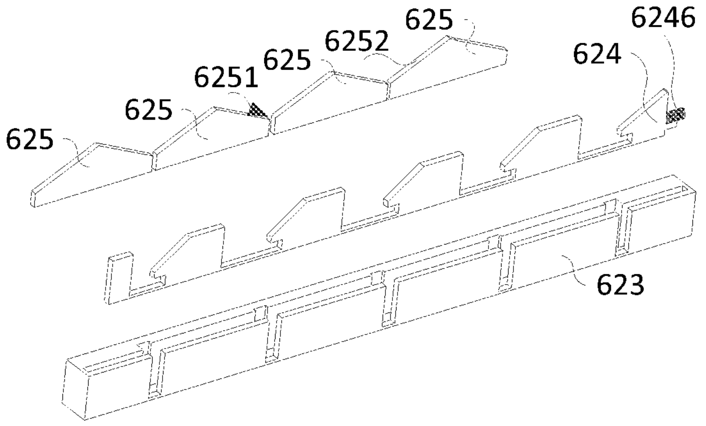

Referring to FIG. 20, in another specific embodiment, the first elastic member 6246 may further be provided at one end of the first limit plate 624 to abut against the inner wall of the carrying plate 623 to provide elasticity for the first limit plate 624, which is simpler in structure and easier to prepare.

In this embodiment, a second limit slot 6232 may further be provided on the carrying plate 623, and the limit block 6214 can be placed in the second limit slot 6232 to realize the limit on the vertical plane (horizontal plane as shown in FIG. 20) of key 621 along its pressing direction. For example, the second limit slot 6232 can limit the key 621 along the extension direction of the carrying plate 623 (left and right directions as shown in FIG. 20).

In this embodiment, the key body 6212 is cylindrically shaped, and the second limit slot 6232 can also limit the rotation of the key body 6212 to avoid the rotation of the key body 6212 causing the limit block 6214 to be staggered with the corresponding first limit slot 6241, thus causing the limit block 6214 to be unable to be pressed into the first limit slot 6241, which can improve the reliability of the rebound assembly.

In other embodiments, corresponding limit slots and limit bulges (not shown in the figures) may further be provided on the key shell 626 which carries the key body 6212 and the key body 6212, respectively, so as to realize the limit on the vertical plane of key 621 along its pressing direction.

In other embodiments, the key body 6212 may also be directly set as a rectangular column or other special-shaped column to prevent the key body 6212 from rotating, without limitation herein.

Referring to FIG. 20, in another specific embodiment, the rebound assembly may further include a plurality of second limit plates 625, which are arranged sequentially along the extension direction of the first limit plate 624, and a third limit slot 6251 may be provided between two adjacent second limit plates 625 to achieve limiting of the key 621 in the vertical plane along its pressing direction. Specifically, after the key 621 is pressed, the limit block 6214 acts on the two adjacent second limit plates 625 to push the two adjacent second limit plates 625 to both sides of the limit block 6214, and other second limit plates 625 approach and abut against each other to form a third limit slot 6251 accommodating the limit block 6214 to achieve limiting of the limit block 6214.

In this embodiment, the second limit plate 625 may be provided with an inclined surface 6252, and the inclined surface 6252 can be used to guide the limit block 6214 to facilitate the limit block 6214 to slide downwards along the inclined surface 6252 to snap into the third limit slot 6251, which can make the process of pressing the key 621 smoother.

Figure 21:
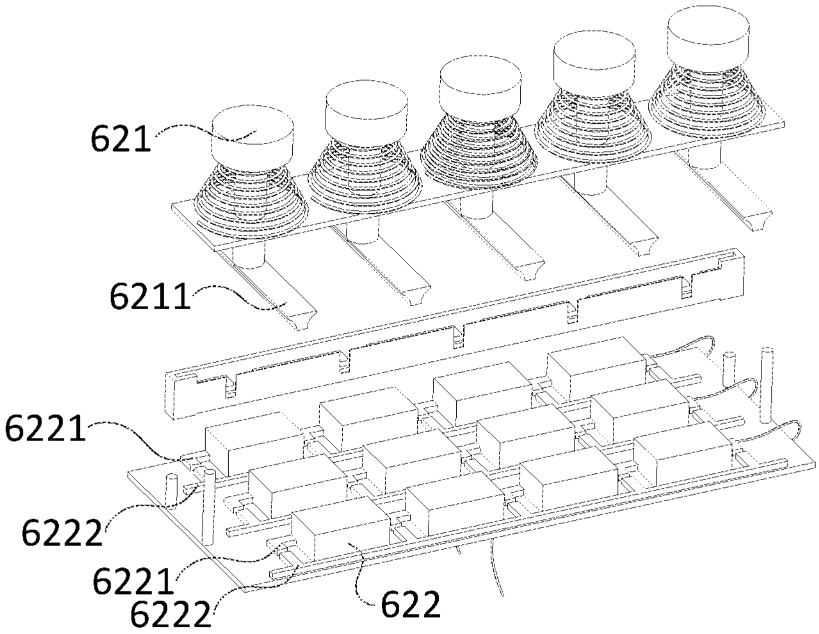
Figure 22:
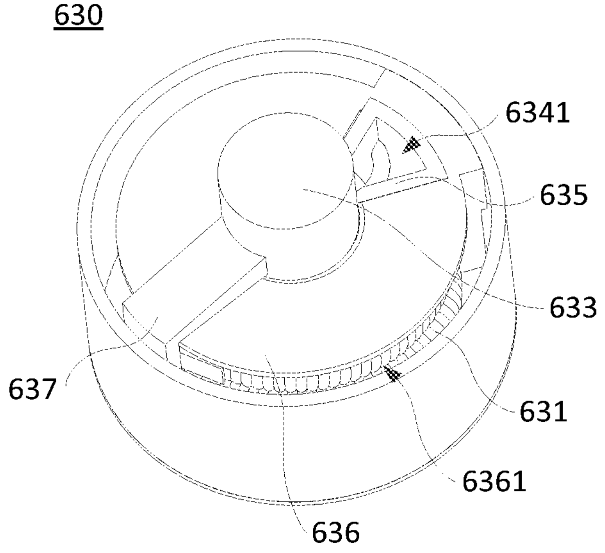
FIGS. 22-26 are schematic structural views of a brake apparatus according to a forth embodiment of the present disclosure.

Referring to FIG. 21, in other embodiments, the number of resistor 622 is multiple, and multiple resistors 622 form multiple resistor groups. Each resistor group includes at least one resistor 622. Multiple resistor groups are spaced along the vertical direction of the extension direction of the first limit plate 624. The guiding connection portion 6211 conducts to each corresponding resistor 622 of the plurality of resistor groups, and thus can electrically connect the corresponding resistor 622 to the magnetic induction mechanism 300 as a load to achieve the change of resisting force.

Referring to FIG. 1, FIG. 22 to FIG. 24, the forth embodiment of the brake apparatus 10 in the present disclosure includes a shaft body 100, a housing 200, a magnetic induction mechanism 300 and an adjustment mechanism 630. The structure of the shaft body 100, the housing 200 and the magnetic induction mechanism 300 is described in the second embodiment of brake apparatus 10 above, which will not be repeated here. The adjustment mechanism 630 is connected with the magnetic induction mechanism 300 for adjusting the magnitude of the resisting force.

In this embodiment, the adjustment mechanism 630 includes a resistor body 631, an abutting member 632 slidingly abutted against the resistor body 631, and an adjustment member 633 connected to the abutting member 632. The resistor body 631 and the adjustment member 633 are electrically connected to the magnetic induction mechanism 300, respectively. The resistor body 631 is integrated and the abutting member 632 is able to be slidingly abutted against the resistor body 631 to achieve stepless adjustment of the resistance value of the resistor body 631 accessed, thus enabling stepless adjustment of resisting force and further expanding the range of application of the brake apparatus 10.

In this embodiment, the brake apparatus 10 further includes a support member 634. The resistor body 631 is arranged on the support member 634. The support member 634 is provided with an opening 6341 for the wire connecting the resistor body 631 and the magnetic induction mechanism 300 to pass through, which can avoid the wire interfering with the resistor body 631 or even causing a short circuit, etc., and improve the safety of the brake apparatus 10.

In this embodiment, the brake apparatus 10 may further include a limit member 635, which is provided corresponding to the opening 6341, for limiting the abutting member 632, so that the abutting member 632 can remain abutting against the resistor body 631, to avoid separating from the resistor body 631, causing problems such as circuit disconnection and improving the reliability of the brake apparatus 10.

In this embodiment, the support member 634 can be set in a tubular shape, the resistor body 631 is set in a fan ring shape, and the resistor body 631 is wound on the support member 634, making the adjustment mechanism 630 compact and reducing the occupied space.

In this embodiment, the abutting member 632 is a resilient piece that can resiliently abut against the resistor body 631, so that the abutting member 632 can remain abutting against the resistor body 631 and is not easily detached.

In this embodiment, the abutting member 632 is provided to extend along the circumferential direction of the support member 634, which is more conducive to the abutting member 632 remaining abutted against the resistor body 631 during rotation relative to the resistor body 631, more reliable, and more convenient for the abutting member 632 to rotate relative to the resistor body 631.

In this embodiment, the adjustment member 633 may include a knob, which is arranged at one end of the support member 634 and can rotate relative to the support member 634 to drive the abutting member 632 to slide relative to the resistor body 631, so as to adjust the resistance value of the resistor of the accessed magnetic induction mechanism 300. By setting the knob to achieve the adjustment of the adjustment mechanism 630, it can make the adjustment operation more convenient, and the knob occupies less space, making the overall structure of the adjustment mechanism 630 more compact.

In this embodiment, the brake apparatus 10 may further include a shell 636, which is sleeved outside the support member 634. The knob is arranged on the shell 636. A through hole 6361 is formed on the end face of the shell 636 with the knob. The knob is connected with the abutting member 632 through a connecting member 637 penetrating the through hole 6361, which can avoid the interference between the connecting member 637 and other parts, so that the knob rotation process is smoother.

In this embodiment, the brake apparatus 10 may further include a cover body (not shown in the figures), which is arranged on the shell 636 to provide protection and dust prevention for the adjustment mechanism 630 and to make the appearance of the brake apparatus 10 more regular.

Figure 25:
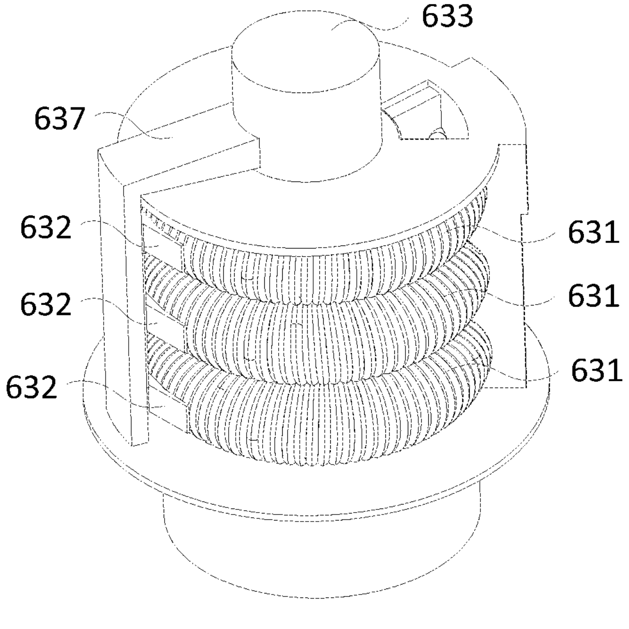
Figure 26:
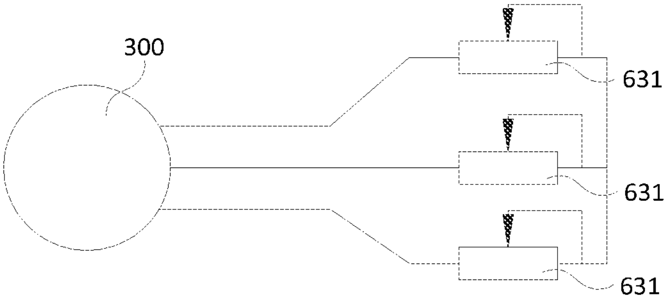

Referring to FIG. 25 and FIG. 26, in other embodiments, the number of resistor body 631 can be multiple, such as two, three, etc. Multiple resistor bodies 631 are connected in parallel. The connecting member 637 is connected with a plurality of abutting members 632 correspondingly for abutting against the corresponding resistor body 631, respectively, to achieve stepless adjustment of the resistance value.

Figure 27:
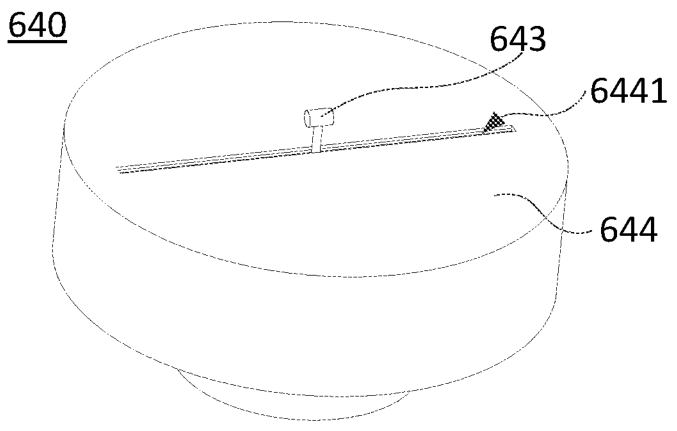
FIGS. 27-30 are schematic structural views of a brake apparatus according to a fifth embodiment of the present disclosure.
Figure 28:
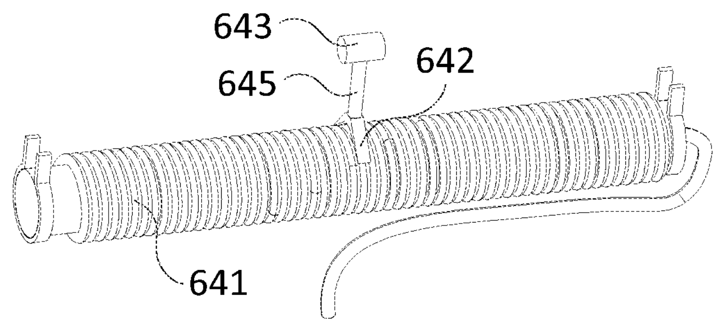

Referring to FIG. 1, FIG. 27 and FIG. 28, the fifth embodiment of the brake apparatus 10 in the present disclosure includes a shaft body 100, a housing 200, a magnetic induction mechanism 300 and an adjustment mechanism 640. The structure of the shaft body 100, the housing 200 and the magnetic induction mechanism 300 is described in the second embodiment of brake apparatus 10 above, which will not be repeated here. The adjustment mechanism 640 is connected with the magnetic induction mechanism 300 for adjusting the magnitude of resisting force.

In this embodiment, the adjustment mechanism 640 includes a resistor body 641, an abutting member 642 sliding against the resistor body 641, and an adjustment member 643 connected to the abutting member 642. The abutting member 642 is electrically connected to one end of the magnetic induction mechanism 300, and one end of the resistor body 641 is electrically connected to one end of the magnetic induction mechanism 300. The resistor body 641 is integrated and the abutting member 642 is able to be slidingly abutted against the resistor body 641 to achieve stepless adjustment of the resistance value of the accessed resistor body 641, thus enabling stepless adjustment of resisting forces and further expanding the range of application of the brake apparatus 10.

In other embodiments, both ends of the resistor body 641 may be electrically connected to both ends of the magnetic induction mechanism 300 respectively, without limitation here.

In this embodiment, the brake apparatus 10 may further include a shell 644, which is used to form an accommodating space to accommodate the resistor body 641. A sliding slot 6441 is provided on the shell 644. The adjustment member 643 includes a handle. The adjustment member is arranged outside the shell 644, and is connected to the abutting member 642 through a connection rod 645 penetrating the sliding slot 6441, so that the adjustment member 643 can be stressed to drive the abutting member 642 to move along the sliding slot 6441, so as to achieve the adjustment of the resistance value of the resistor body 641. By setting the adjustment member 643 sliding to realize the adjustment of the adjustment mechanism 640, it can be easily for the user to hold in hands, making the adjustment operation more convenient.

In this embodiment, the abutting member 642 may be electrically connected to the magnetic induction mechanism 300 via a conductive slider (not shown in the figures) provided in the shell 644, or it may be directly electrically connected to the magnetic induction mechanism 300 via a wire, without limitation herein.

Figure 29:
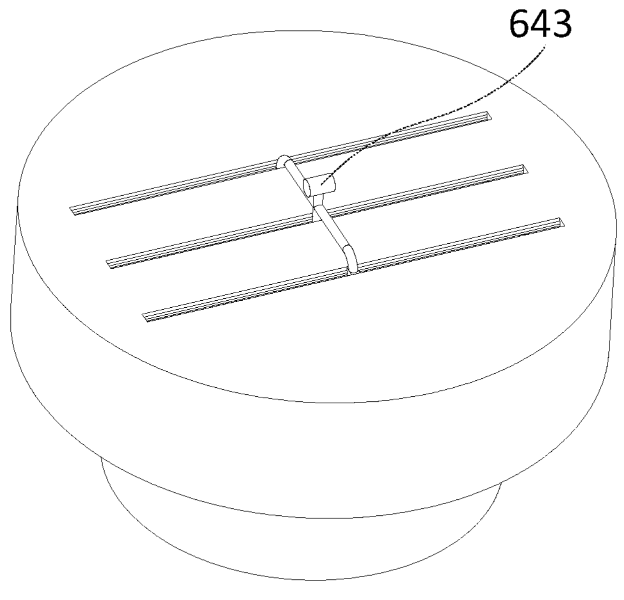
Figure 30:
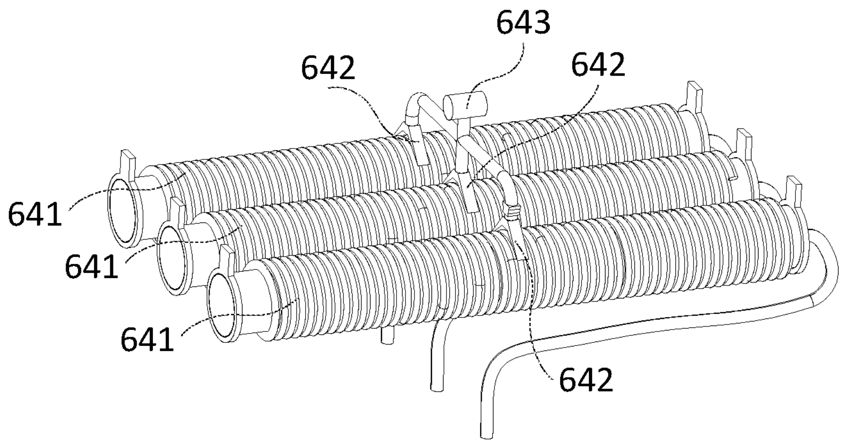
Figure 31:
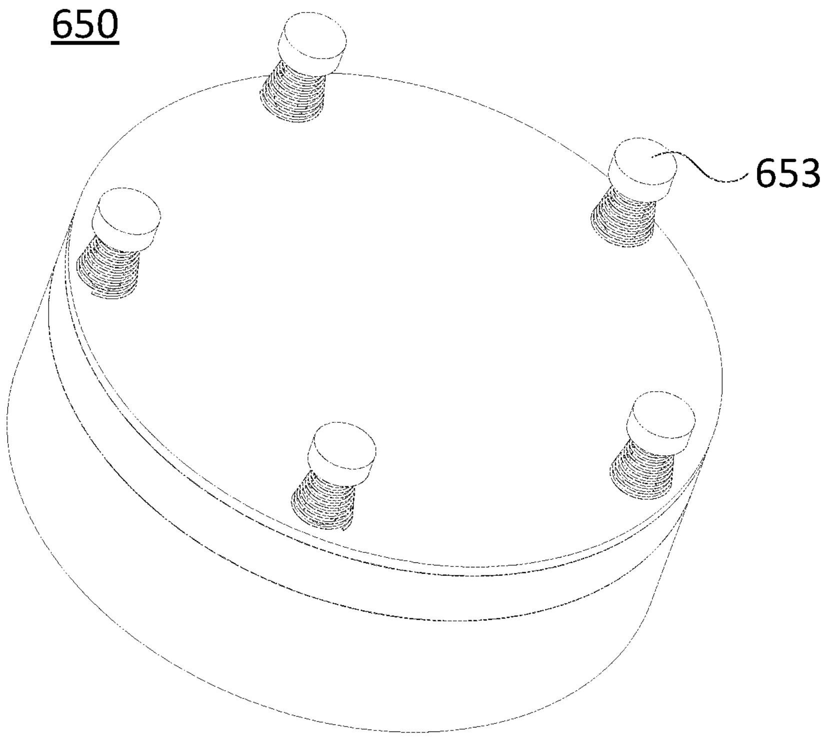
FIGS. 31-34 are schematic structural views of a brake apparatus according to a sixth embodiment of the present disclosure.
Figure 32:
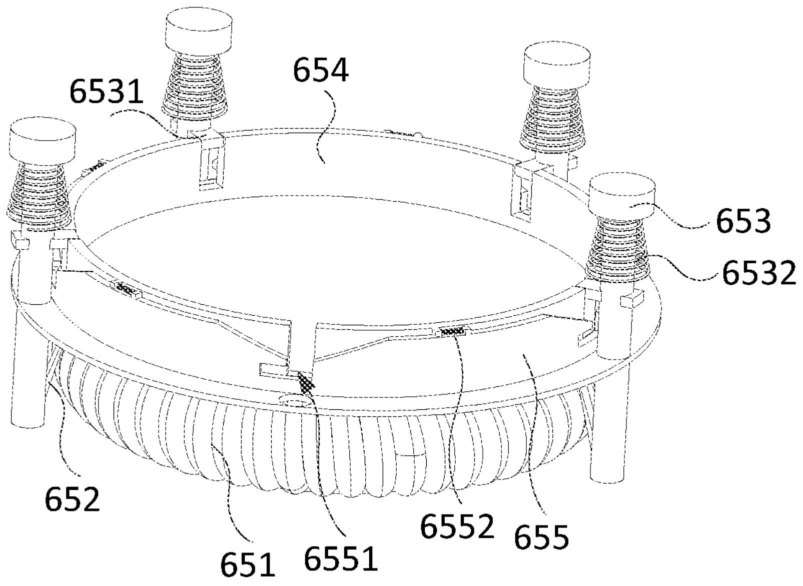
Figure 33:
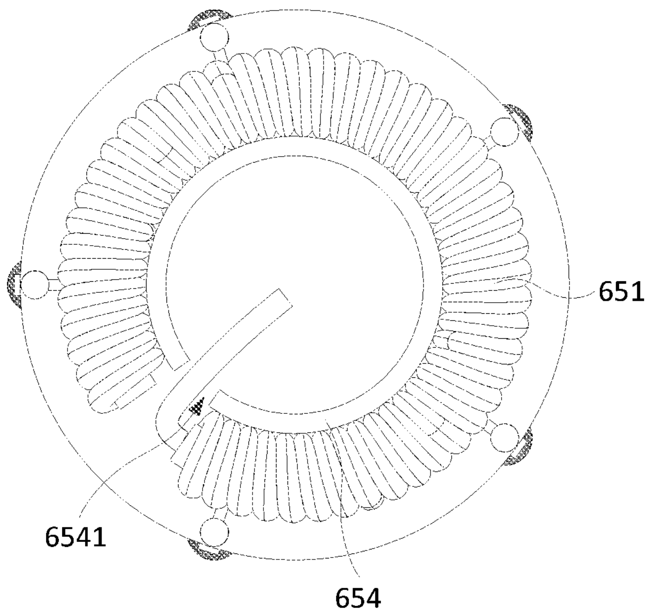

Referring to FIG. 26, FIG. 29 and FIG. 30, the number of resistor body 641 can be multiple, such as three, etc. The adjustment member 643 may be connected with three abutting members 642, each abutting member 642 abuts against the corresponding resistor body 641 respectively, to achieve stepless adjustment of the resistance value.

Referring to FIG. 1, FIG. 31 to FIG. 33, the sixth embodiment of the brake apparatus 10 in the present disclosure includes a shaft body 100, a housing 200, a magnetic induction mechanism 300 and an adjustment mechanism 650. The structure of the shaft body 100, the housing 200 and the magnetic induction mechanism 300 is described in the second embodiment of brake apparatus 10 above, which will not be repeated here. The adjustment mechanism 650 is connected with the magnetic induction mechanism 300 for adjusting the magnitude of resisting force.

In this embodiment, the adjustment mechanism 650 includes a resistor body 651, an abutting member 652 for abutting against the resistor body 651, and an adjustment member connected to the abutting member 652. The abutting member 652 is electrically connected to one end of the magnetic induction mechanism 300, and one end of the resistor body 651 is electrically connected to one end of the magnetic induction mechanism 300. By setting the integrated resistor body 651 and the abutting member 652 abutting against the resistor body 651, the resistance value of the resistor body 651 accessed can be changed. Compared with the way of setting multiple resistors and contacting through contacts, in this embodiment, because the outer circumference of the resistor body 651 can be provided with uninterrupted arc contacts, the abutting area between the abutting member 652 and the resistor body 651 is larger and more reliable, and it is easy to subsequently change the resistance value of the resistor body 651 accessed. For example, the resistance value of the resistor body 651 accessed can be changed by changing the abutting position of the abutting member 652 and the resistor body 651.

In other embodiments, both ends of the resistor body 651 may be electrically connected to two ends of the magnetic induction mechanism 300 respectively, without limitation here.

In this embodiment, the adjustment member includes at least one key 653. The at least one key 653 is connected to the corresponding abutting member 652. The abutting member 652 is electrically connected to one end of the magnetic induction mechanism 300, and one end of the resistor body 651 is electrically connected to one end of the magnetic induction mechanism 300, so that when the at least one key 653 is pressed, the abutting member 652 is conducted to the resistor body 651, and then at least part of the corresponding resistor body 651 is electrically connected to the magnetic induction mechanism 300 as a load to realize the change of resisting force. By setting the key 653 to realize the adjustment of the adjustment mechanism 650, it can make the touch of adjustment more obvious and the gear adjustment more reliable.

In other embodiments, both ends of the resistor body 651 may be electrically connected to two ends of the magnetic induction mechanism 300 respectively, without limitation here.

In this embodiment, the brake apparatus 10 may further include a support member 654, which is set in a tubular shape. The resistor body 651 is set in a fan ring shape, and the resistor body 651 is wound on the support member 654, making the structure of the adjustment mechanism 650 compact and reducing the occupied space.

In this embodiment, the support member 654 is provided with an opening 6541 for the wire connecting the resistor body 651 and the magnetic induction mechanism 300 to pass through, which can avoid the wire interfering with the resistor body 651 or even causing a short circuit, etc., and improve the safety of the brake apparatus 10.

In this embodiment, the adjustment mechanism 650 may further include a rebound assembly, which includes a first limit plate 655 provided on the support member 654. The limit and rebound of the key 653 is achieved by a first limit slot 6551 on the first limit plate 655, a first elastic member 6552 between the support member 654 and the first limit plate 655, the limit block 6531 provided on the key 653, and a second elastic member 6532 sleeved on the key 653. Specifically, please refer to the rebound assembly in the third embodiment of the brake apparatus 10 above, which will not be repeated here.

Figure 34:
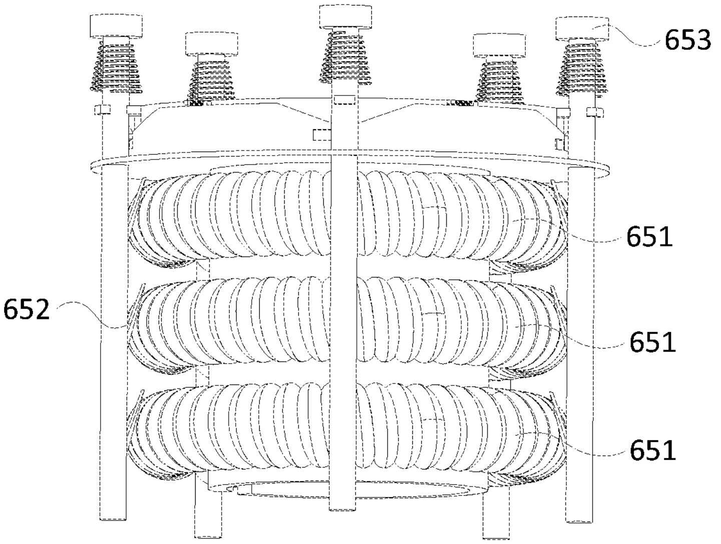

Referring to FIG. 34, in other embodiments, the number of resistor body 651 may be multiple, such as three, etc. The key 653 is correspondingly connected with multiple abutting members 652 for abutting against the corresponding resistor bodies 651, respectively, to achieve the adjustment of resistance value.

Figure 35:
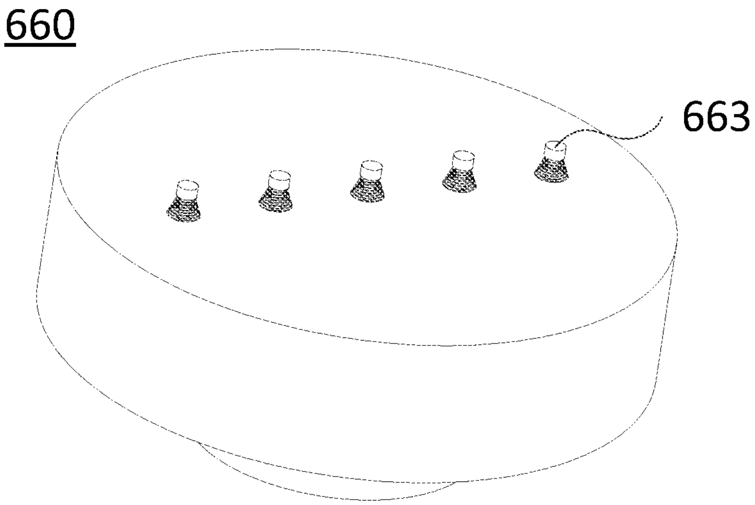
FIGS. 35-37 are schematic structural views of a brake apparatus according to a seventh embodiment of the present disclosure.
Figure 36:
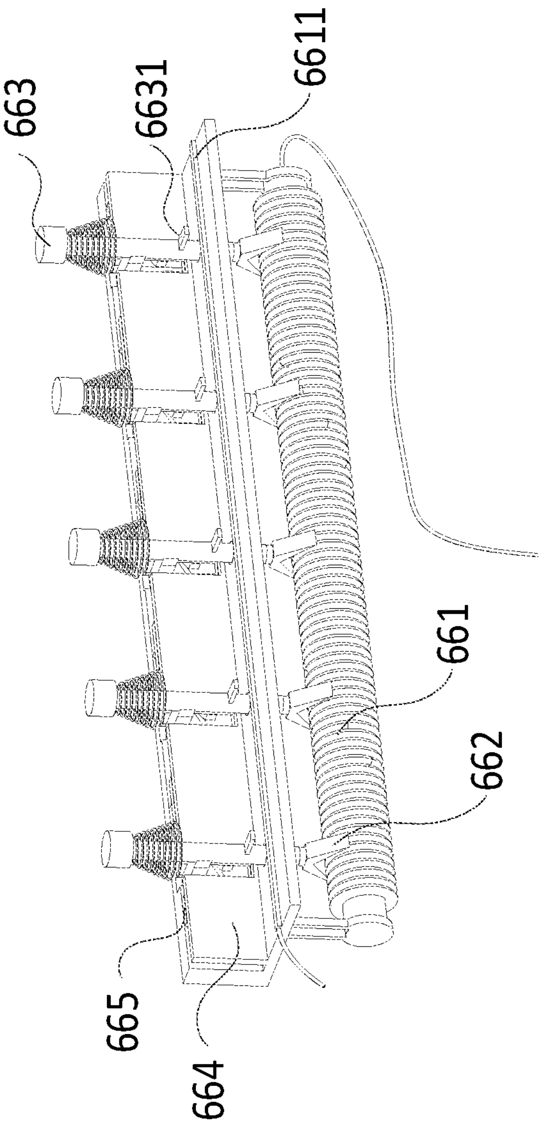

Referring to FIG. 1, FIG. 35 and FIG. 36, the seventh embodiment of the brake apparatus 10 in the present disclosure includes a shaft body 100, a housing 200, a magnetic induction mechanism 300 and an adjustment mechanism 660. The structure of the shaft body 100, the housing 200 and the magnetic induction mechanism 300 is described in the second embodiment of the brake apparatus 10 above, which will not be repeated here. The adjustment mechanism 660 is connected with the magnetic induction mechanism 300 for adjusting the magnitude of resisting force.

In this embodiment, the adjustment mechanism 660 includes a resistor body 661, an abutting member 662 for abutting against the resistor body 661, and an adjustment member connected to the abutting member 662. The abutting member 662 is electrically connected to one end of the magnetic induction mechanism 300, and one end of the resistor body 661 is electrically connected to one end of the magnetic induction mechanism 300. By setting the integrated resistor body 661 and the abutting member 662 abutting against the resistor body 661 to change the resistance value of the resistor body 661 accessed, the abutting area between the abutting member 662 and the resistor body 661 is larger and more reliable, thus making it easy to subsequently change the resistance value of the resistor body 661 accessed. For example, the resistance value of the resistor body 661 accessed can be changed by changing the abutting position of the abutting member 662 and the resistor body 661.

In this embodiment, the adjustment member includes at least two keys 663. The at least two keys 663 are connected to the corresponding abutting members 652 respectively. The at least two keys 663 are provided with a guiding connection portion 6631 respectively. The brake apparatus further includes a connection portion 6611. The connection portion 6611 is electrically connected to one end of the magnetic induction mechanism 300, and the resistor body 661 is electrically connected to one end of the magnetic induction mechanism 300, so that when one of the at least two keys 663 is pressed, the guiding connection portion 6631 can be conducted to the connection portion 6611. By setting the keys 663 to realize the adjustment of the adjustment mechanism 660, it can make the touch of adjustment more obvious and the gear adjustment more reliable.

In other embodiments, both ends of the resistor body 661 may be electrically connected to both ends of the magnetic induction mechanism 300 respectively, without limitation here.

In this embodiment, the at least two keys 663 may be spaced along a straight line, and the resistor body 661 is set in a straight line. In other embodiments, the at least two keys 663 may also be aligned along a curve or other linear shape, without limitation herein.

In other embodiments, the adjustment member may include only one key 663. The key 663 is provided with a guiding connection portion 6631. The brake apparatus 10 further includes a connection portion 6611. The connection portion 6631 is electrically connected to one end of the magnetic induction mechanism 300, and the two ends of the resistor body 661 are electrically connected to the two ends of the magnetic induction mechanism 300, so that when at least one key 663 is pressed, the guiding connection portion 6631 can conduct with the connection portion 6631, and thus at least part of the corresponding resistor body 661 can be connected to the magnetic induction mechanism 300 as a load to achieve a change in resisting force.

In this embodiment, the brake apparatus 10 may further include a rebound assembly, which can act on at least two keys 663 respectively, so that when one of the at least two keys 663 is pressed, another key 663 can be popped up. The rebound assembly may include a carrying plate 664 and a first limit plate 665, the specific structure of which is described in the rebound assembly in the third embodiment of the brake apparatus 10 above and will not be repeated here.

Figure 37:
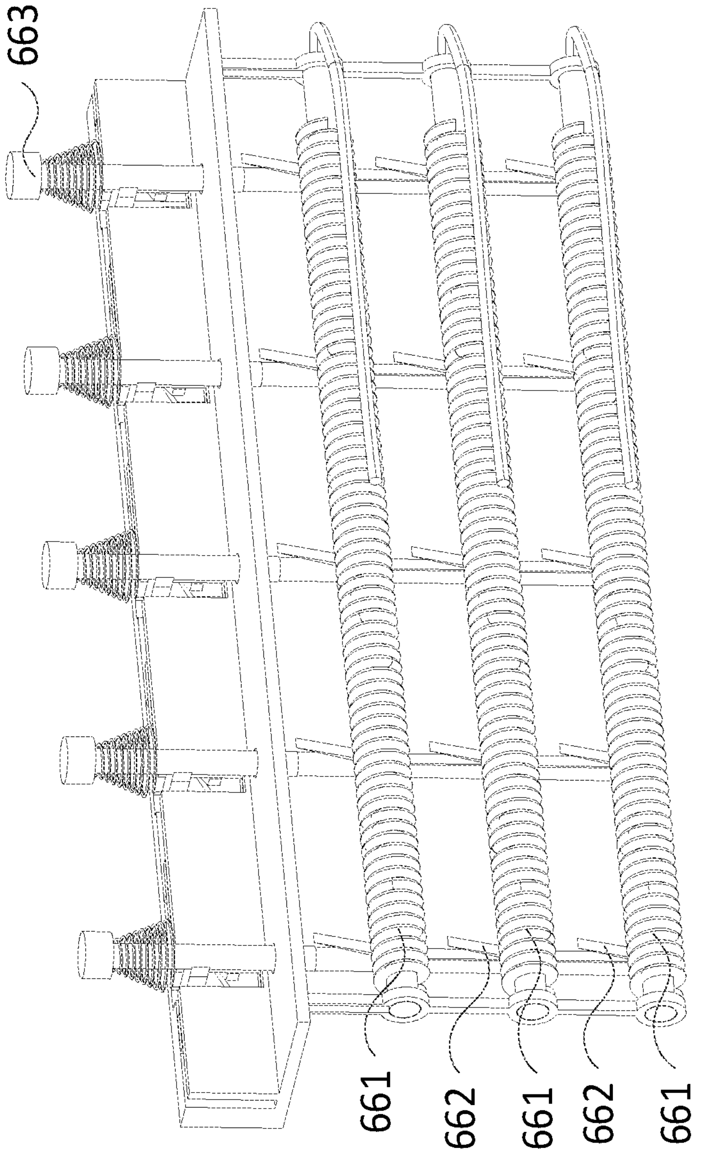

Referring to FIG. 37, in other embodiments, the number of resistor body 661 may be multiple, such as three, etc. The plurality of resistor bodies 661 are spaced. The keys 663 are correspondingly connected with multiple abutting members 662 for abutting against the corresponding resistor bodies 661, respectively, to achieve the adjustment of the resistance value.

Figure 38:
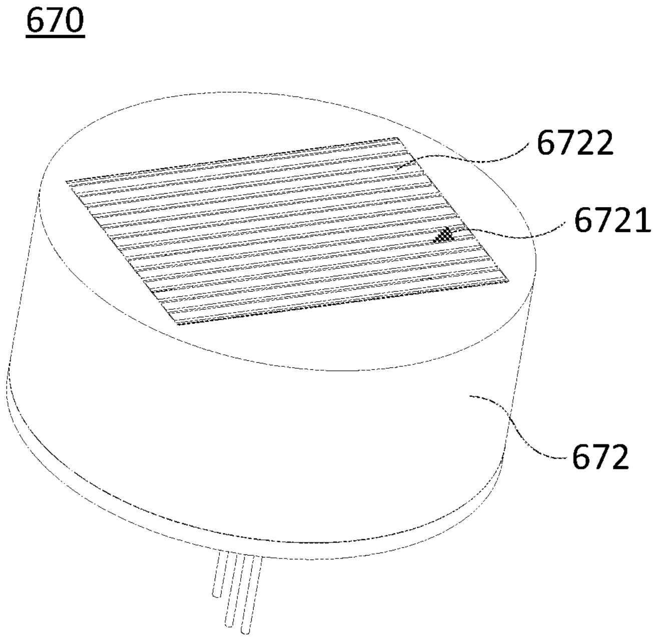
FIGS. 38-39 are schematic structural views of a brake apparatus according to an eighth embodiment of the present disclosure.
Figure 39:
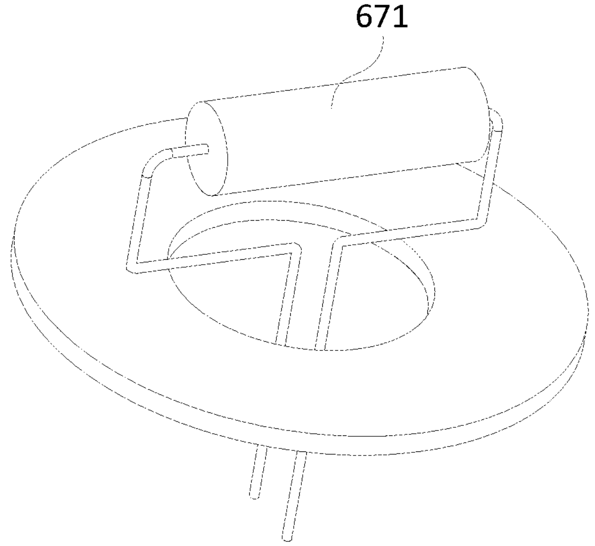

Referring to FIG. 1, FIG. 38 and FIG. 39, the eighth embodiment of the brake apparatus 10 in the present disclosure includes a shaft body 100, a housing 200, a magnetic induction mechanism 300 and an adjustment mechanism 670. The structure of the shaft body 100, the housing 200 and the magnetic induction mechanism 300 is described in the second embodiment of brake apparatus 10 above, which will not be repeated here. The adjustment mechanism 670 is connected with the magnetic induction mechanism 300 for adjusting the magnitude of resisting force.

In this embodiment, the adjustment mechanism 670 can include a sensitive resistor 671, the two ends of the sensitive resistor 671 are electrically connected to the two ends of the magnetic induction mechanism 300 respectively, the sensitive resistor 671 can be a pressure-sensitive resistor, light-sensitive resistor, moisture-sensitive resistor, magnetic-sensitive resistor or force-sensitive resistor, etc., which can change the resistance value according to the change of received voltage, light, humidity, magnetic field strength or force, so as to achieve a change in resisting force. By setting the sensitive resistor 671 to realize the adjustment of the adjustment mechanism 670, it can make the structure of the adjustment mechanism 670 more simple, easy to prepare, and occupy less space, making the structure of the brake apparatus 10 more compact.

In this embodiment, the adjustment mechanism 670 may also include a shell 672, on which heat dissipation holes 6721 are provided for heat dissipation of the sensitive resistor 671 to avoid problems such as unstable resistance value due to high temperature rise of the sensitive resistor 671.

In this embodiment, the sensitive resistor 671 may be a force-sensitive resistor, and a press plate 6722 with certain elasticity may be provided between the plurality of heat dissipation holes 6721 to enable the press plate 6722 to accept a force to produce a deformation to transfer the force to the sensitive resistor 671 to achieve the adjustment of the resistance value of the sensitive resistor 671.

Figure 40:
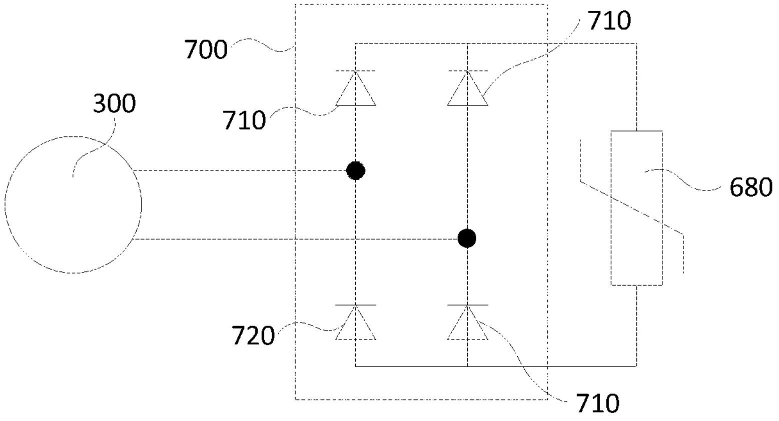
FIGS. 40-42 are schematic structural views of a brake apparatus according to a ninth embodiment of the present disclosure.

Referring to FIG. 1, and FIG. 40, the ninth embodiment of the brake apparatus 10 in the present disclosure includes a shaft body 100, a housing 200, a magnetic induction mechanism 300, a rectifier mechanism 700 and an adjustment mechanism 680. The structure of the shaft body 100, the housing 200 and the magnetic induction mechanism 300 is described in the second embodiment of brake apparatus 10 above, which will not be repeated here. The rectifier mechanism 700 is electrically connected to the magnetic induction mechanism 300 for rectifying the current of the magnetic induction mechanism 300, and the adjustment mechanism 680 is connected with the magnetic induction mechanism 300 for adjusting the magnitude of resisting force. By setting the rectifier mechanism 700 to rectify output of the multiple wires of the magnetic induction mechanism 300, the structure of the adjustment mechanism 680 can be simplified, making the overall structure of the brake apparatus 10 simpler, more compact and occupying less space.

In this embodiment, the magnetic induction mechanism 300 leads out at least two wires. The rectifier mechanism 700 is electrically connected to the at least two wires to rectify the current in the at least two wires. The first end of the rectifier mechanism 700 is electrically connected to the first end of the adjustment mechanism 680, and the second end of the rectifier mechanism 700 is electrically connected to the second end of the adjustment mechanism 680 for delivering the rectified current to the adjustment mechanism 680, and then the resistance value of the rectifier mechanism 700 accessed can be adjusted by the adjustment mechanism 680.

In this embodiment, the rectifier mechanism 700 may include two first diodes 710 and two second diodes 720. The first ends of the two first diodes 710 are electrically connected to each other and electrically connected to the first end of the adjustment mechanism 680, the second ends of the two first diodes 710 are electrically connected to two wires respectively, the first ends of the two second diodes 720 are electrically connected to two wires respectively, and the second ends of the two second diodes 720 are electrically connected to each other and electrically connected to the second end of the adjustment mechanism 680, thus enabling rectification of the current output from the magnetic induction mechanism 300, such as the AC current output from the magnetic induction mechanism 300 can be rectified into DC current, which can make the adjusting process of the adjustment mechanism 680 more stable.

Figure 41:
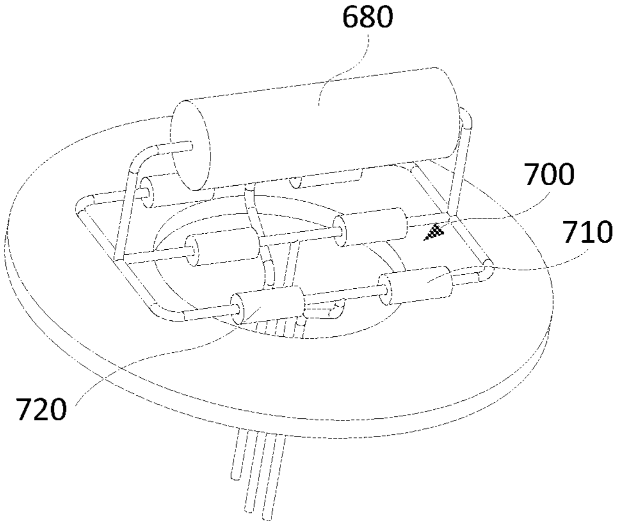
Figure 42:
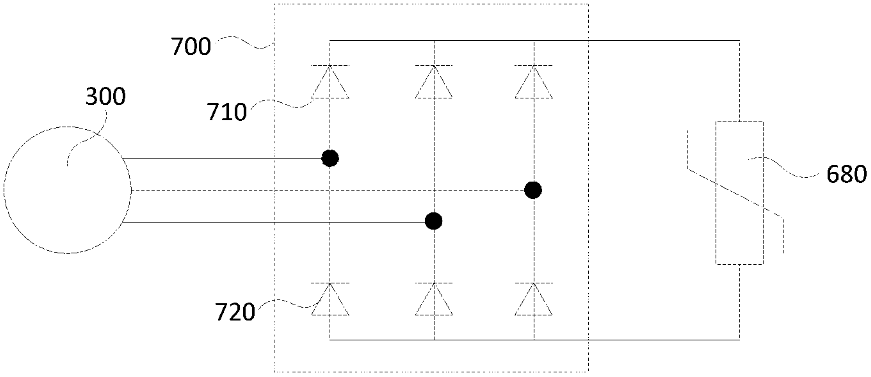

Referring to FIG. 41 and FIG. 42, in another specific embodiment, the rectifier mechanism 700 may include three first diodes 710 and three second diodes 720. The first ends of the three first diodes 710 are electrically connected to each other and electrically connected to the first end of the adjustment mechanism 680, the second ends of the three first diodes 710 are electrically connected to three wires respectively, the first ends of the three second diodes 720 are electrically connected to three wires respectively, and the second ends of the three second diodes 720 are electrically connected to each other and electrically connected to the second end of the adjustment mechanism 680, thus enabling rectification of the current output of the magnetic induction mechanism 300, for example, the three-phase output of the magnetic induction mechanism 300 can be rectified into a two-phase output, which can achieve adjustment by a resistor to simplify the structure of the adjustment mechanism 680.

In other embodiments, the rectification mechanism 70 may also include more than three first diodes 710 and three second diodes 720 to rectify the output of more than three phases of the magnetic induction mechanism 300, without limitation here.

In this embodiment, the adjustment mechanism 680 includes a sensitive resistor. The first end of the rectifier mechanism 700 is connected to the first end of the sensitive resistor, and the second end of the rectifier mechanism 700 is connected to the second end of the sensitive resistor. The sensitive resistor is able to change the resistance value so as to realize the change of resisting force. The adjustment of the adjustment mechanism 680 is realized by setting the sensitive resistor.

In other embodiments, the adjustment mechanism 680 may further include an adjustment member and a resistor, such as the second embodiment, the third embodiment of the brake apparatus 10 described above; or the adjustment mechanism 680 may further include a resistor body, an abutting member sliding against the resistor body, and an adjustment member connected to the abutting member, such as the fourth embodiment, the fifth embodiment, the sixth embodiment, the seventh embodiment of the brake apparatus 10 described above, which will not be repeated here.

Figure 43:
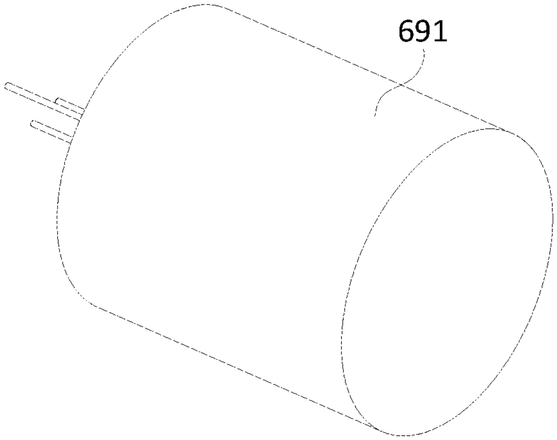
FIGS. 43-46 are schematic structural views of a brake apparatus according to a tenth embodiment of the present disclosure.
Figure 44:
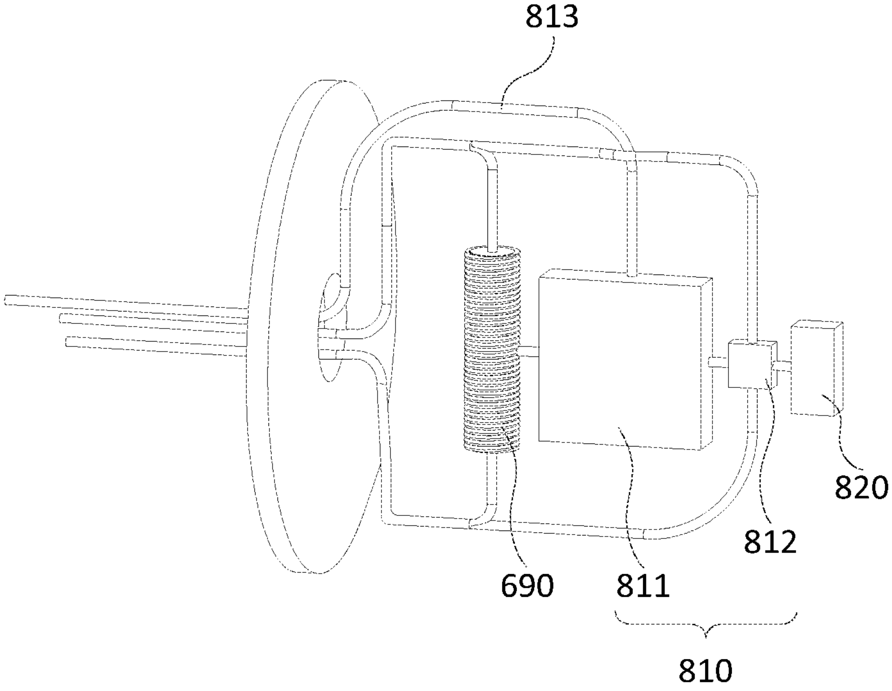

Referring to FIG. 1, FIG. 43 and FIG. 44, the tenth embodiment of the brake apparatus 10 in the present disclosure includes a shaft body 100, a housing 200, a magnetic induction mechanism 300, an adjustment mechanism 690, a control mechanism 810 and a power storage mechanism 820. The structure of the shaft body 100, the housing 200 and the magnetic induction mechanism 300 is described in the first embodiment of brake apparatus 10 above, which will not be repeated here. The adjustment mechanism 690 is connected to the magnetic induction mechanism 300 for adjusting the magnitude of the resisting force. The control mechanism 810 is connected to the adjustment mechanism 690 and the power storage mechanism 820 respectively. The control mechanism 810 is used to control the adjustment mechanism 690 to adjust resisting force, and deliver current to the power storage mechanism 820 for storage when the current is greater than or equal to a current threshold. By setting the control mechanism 810, it can realize the automatic adjustment of the adjustment mechanism 690, which further improves the intelligence of the brake apparatus 10, making the brake apparatus 10 more widely applicable. In addition, by setting the power storage mechanism 820 to store power, it can supply current to the control mechanism 810 when the power provided by the magnetic induction mechanism 300 is insufficient, which makes the brake apparatus 10 more reliable and safer.

In this embodiment, a shell 691 may further be provided, and the adjustment mechanism 690, the control mechanism 810 and the power storage mechanism 820 may all be arranged inside the shell 691.

In this embodiment, the control mechanism 810 includes a main controller 811 and a power controller 812. The main controller 811 is connected to the adjustment mechanism 690. The power controller 812 is connected to the main controller 811 and connected to the magnetic induction mechanism 300 and the power storage mechanism 820 respectively. The power controller 812 is used to receive the current provided by the magnetic induction mechanism 300 and deliver at least a portion of the current to the main controller 811 to maintain the normal operation of the main controller 811 and deliver another portion of the current to the power storage mechanism 820 when the current is greater than or equal to the current threshold to achieve the storage of power.

In this embodiment, the brake apparatus 10 may further include a speed detection mechanism (not shown in the figures), which is connected with the control mechanism 810 by the wire 813. The speed detection mechanism is for detecting the rotational speed of the housing 200, and the control mechanism 810 is for controlling the adjustment mechanism 690 to adjust resisting force according to the rotational speed, which makes the brake apparatus 10 more intelligent.

In this embodiment, the speed detection mechanism can be set on the housing 200 or the brake apparatus 10. The speed detection mechanism can be a pressure sensor, image sensor, photoelectric sensor, etc., and the rotational speed of the housing 200 can be detected by the received pressure, pictures, videos or light, etc.

In this embodiment, the adjustment mechanism 690 may include a resistor body and an abutting member sliding against the resistor body (not shown in the figures). The first end of the magnetic induction mechanism 300 is connected to the first end of the resistor body, and the second end of the magnetic induction mechanism 300 is connected to the abutting member; or the second end of the magnetic induction mechanism 300 is connected to the abutting member and the second end of the resistor body. The control mechanism 810 controls the abutting member to slide relative to the resistor to change the resistance value of the resistor body accessed to the magnetic induction mechanism 300. Specifically, the structure of the adjustment mechanism 690 is described in the fourth embodiment, the fifth embodiment, the sixth embodiment, and the seventh embodiment of the brake apparatus 10 above, and will not be repeated here.

In other embodiments, the adjustment mechanism 690 may further include at least one resistor and an adjustment member. The first end of the at least one resistor is connected to the first end of the magnetic induction mechanism 300, the adjustment member is connected to the second end of the magnetic induction mechanism 300, and the control mechanism 810 controls the adjustment member to connect to the first end or the second end of the at least one resistor to change the total resistance value of the resistor accessed to the magnetic induction mechanism 300. Specifically, the structure of the adjusting mechanism 690 is described in the second embodiment, the third embodiment of the brake apparatus 10 above, and will not be repeated here.

In other embodiments, the adjustment mechanism 690 may further include a sensitive resistor and an adjustment member (not shown in the figures). The two ends of the magnetic induction mechanism 300 are connected to the two ends of the sensitive resistor respectively. The control mechanism 810 controls the adjustment member to change the resistance value of the sensitive resistor accessed to the magnetic induction mechanism 300.

Figure 45:
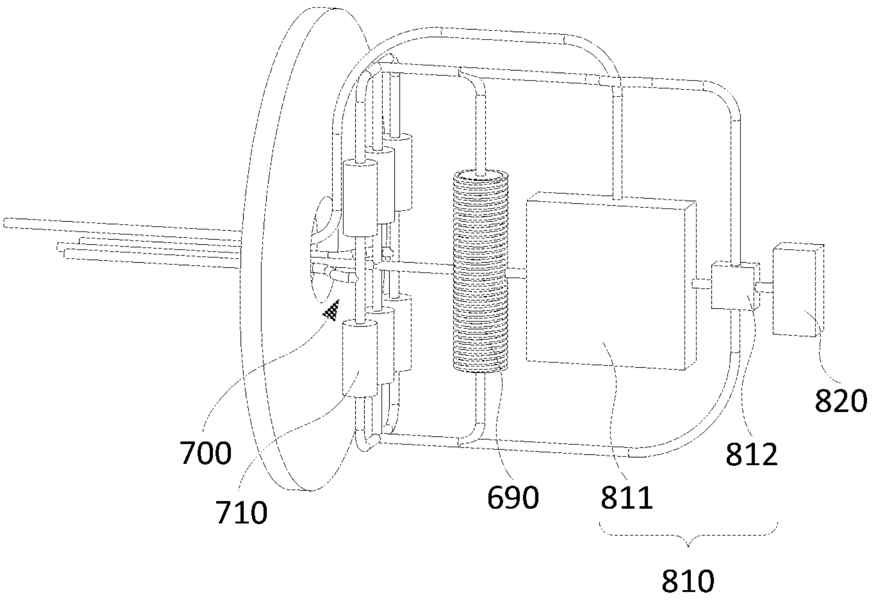
Figure 46:
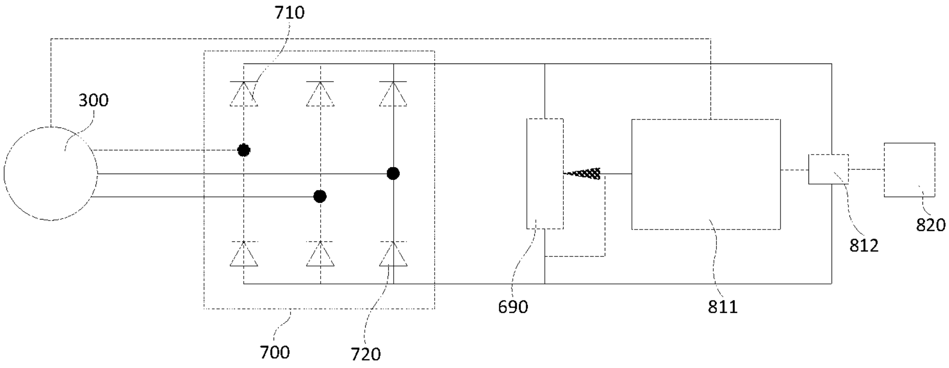

Referring to FIG. 45 and FIG. 46, in other embodiments, the brake apparatus 10 may further include a rectifier mechanism 700, which is connected to the magnetic induction mechanism 300 and the adjustment mechanism 690, respectively, for rectifying the current output from the magnetic induction mechanism 300. The structure of the rectifier mechanism 700 is described in the ninth embodiment of the brake apparatus 10 above, and will not be repeated here.

In this embodiment, the rectifier mechanism 700 rectifies current form at least two wires introduced from the magnetic induction mechanism 300 and then leads out two wires to be electrically connected to the two ends of the adjustment mechanism 690. In other embodiments, instead of rectifier mechanism 700, three sets of resistors, resistor bodies or sensitive resistors may be provided directly in the adjustment mechanism 690 to electrically connect with the three wires introduced from the magnetic induction mechanism 300, specifically as described in the above-mentioned embodiment of the brake apparatus 10, which will not be repeated here.

Figure 2:
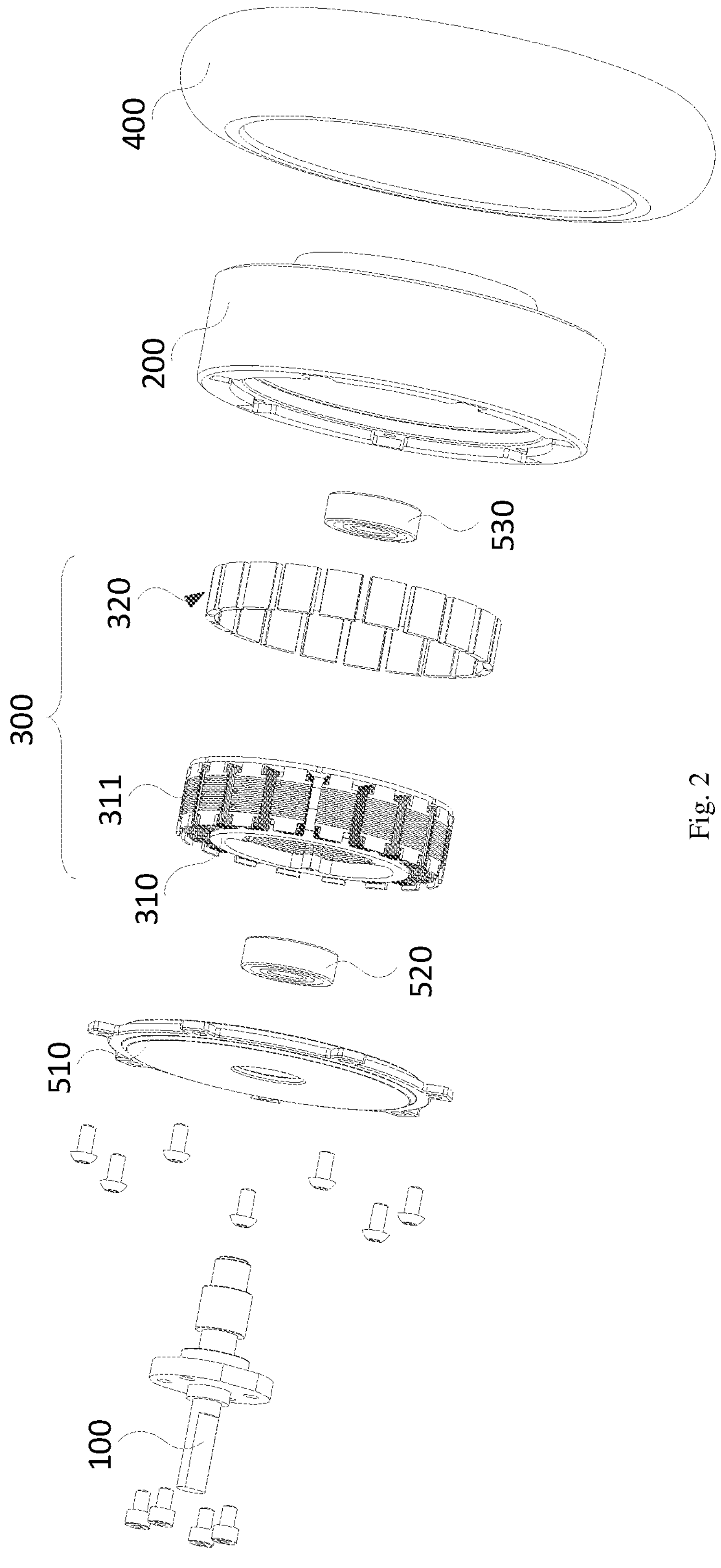
Figure 3:
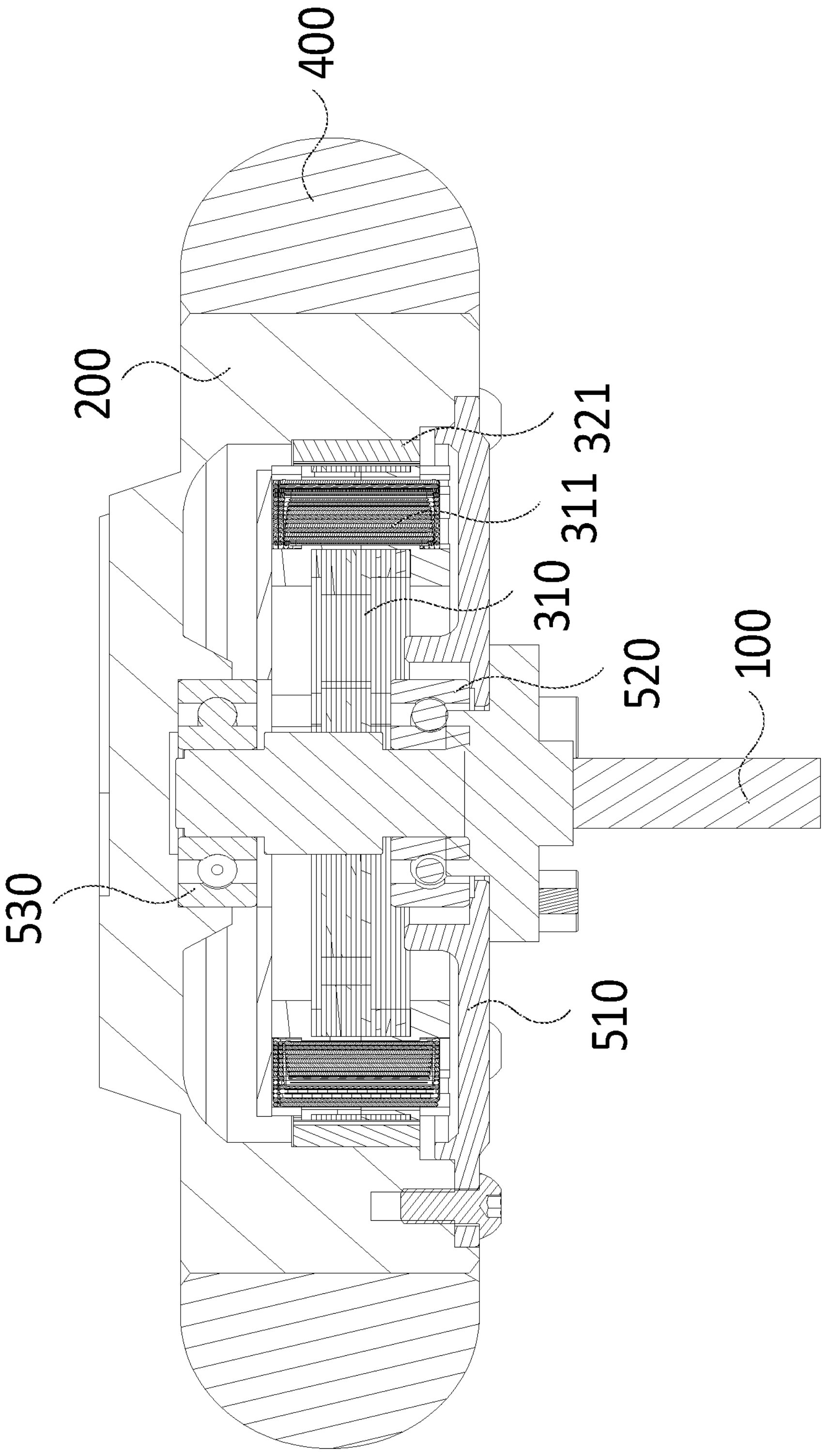
Figure 4:
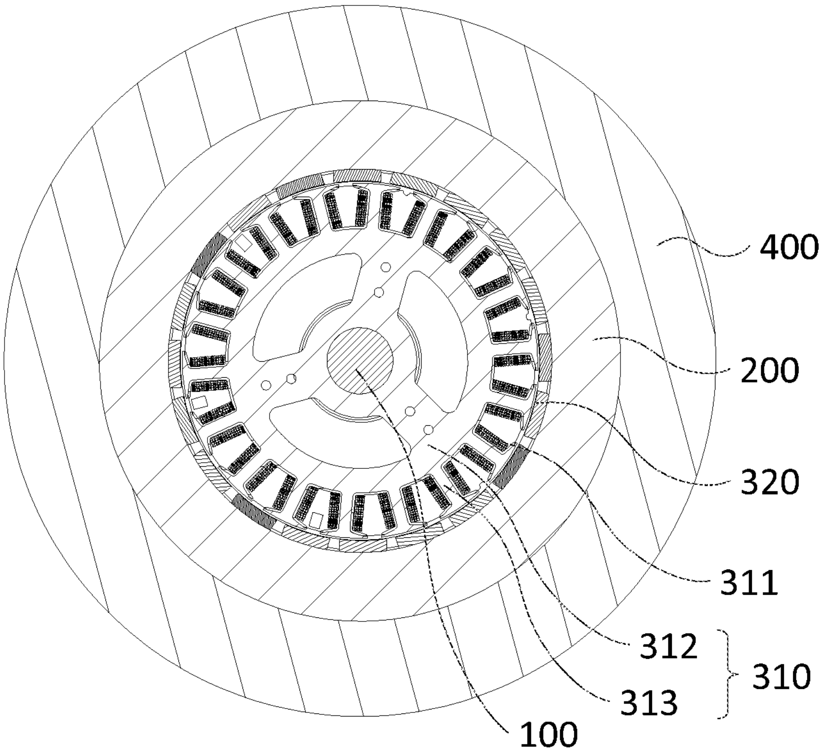
Figure 47:
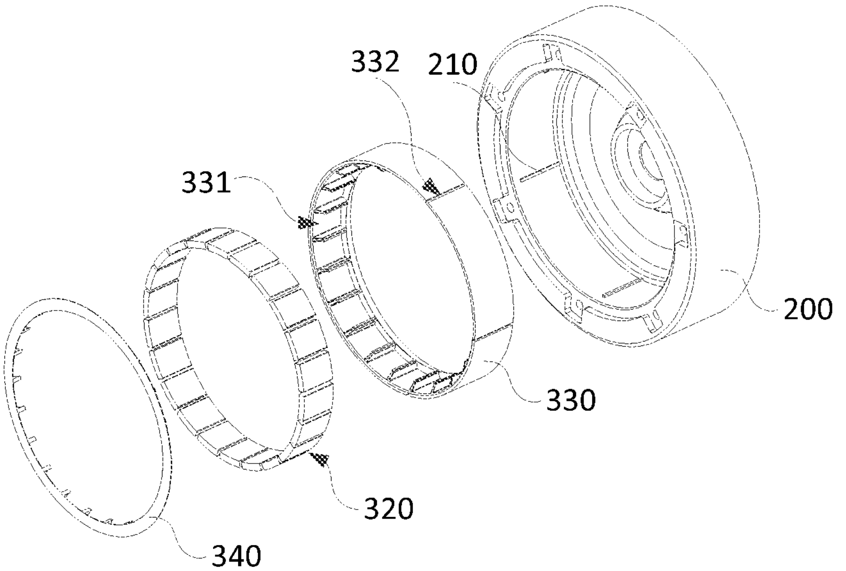
FIG. 47 is a schematic structural view of a brake apparatus according to an eleventh embodiment of the present disclosure.

Referring to FIG. 1, FIG. 2 and FIG. 47, the eleventh embodiment of the brake apparatus 10 of the present disclosure includes a shaft body 100, a housing 200, a magnetic inductor 310 and a magnet assembly 320, the housing 200 sleeved outside the shaft body 100 and configured coaxially with the shaft body 100, the housing 200 is rotatable relative to the shaft body 100, the magnetic inductor 310 has coils 311 wound thereon, the magnet assembly 320 includes a plurality of magnets spaced along the circumferential direction of the shaft body 100, One of the magnetic inductor 310 or the magnet assembly 320 is connected to the shaft body 100 and another one is connected to the housing 200, and the magnetic inductor 310 and/or the magnet assembly 320 is removably connected to the shaft body 100 or the housing 200, so that when the housing 200 rotates relative to the shaft body 100, the coils 311 are capable of cutting the magnetic field formed by the magnet assembly 320, thereby generating resisting force opposite to a rotation direction of the housing 200 or the shaft body 100. In addition, the magnitude of resisting force can be changed by replacing the magnetic inductor 310 and/or the magnet assembly 320, which is able to adapt to the needs of different users and different environments, making the brake apparatus 10 more widely applicable.

In this embodiment, the brake apparatus 10 may further include a carrying member 330, which is removably connected to the inside of the housing 200. A plurality of mounting slots 331 are provided at the inner side of the carrying member 330, and a plurality of magnets of the magnet assembly 320 are provided inside the plurality of mounting slots 331. By replacing the carrying member 330 and the magnet assembly 320 carried on the carrying member 330, the number, size and arrangement structure of the magnets in the magnet assembly 320 can be changed to change the magnetic field generated by the magnet assembly 320, and then change the resisting force generated by the interaction between the magnetic inductor 310 and the magnet assembly 320 to achieve the adjustment of resisting force.

In this embodiment, the carrying member 330 is provided with a first limit portion, and the housing 200 is provided with a second limit portion. The first limit portion engages with the second limit portion to limit the carrying member 330, which can avoid rotation of the carrying member 330 relative to the housing 200 in the process of rotation of the housing 200, making the magnetic field generated by the magnet assembly 320 more stable, and then making the resisting force generated by interaction of the magnetic inductor 310 and the magnet assembly 320 more stable.

In this embodiment, the first limit portion may be a limit groove 332, the second limit portion may be a limit bulge 210, and the limit bulge 210 and the limit groove 332 are arranged to extend along the axis direction of the housing 200 to achieve limiting of the carrying member 330 along the circumferential direction of the shaft body 100, which has a simple structure, is easy to prepare, and has a high reliability.

In other embodiments, the first limit portion may also be a limit bulge and the second limit portion may be a corresponding limit groove, without limitation herein.

In this embodiment, the brake apparatus 10 may further include a retaining ring 340, which covers one end of the carrying member 330 to clamp the magnet assembly 320 in the mounting slot 331, to achieve an axial limit of the magnet assembly 320 along the axis direction of the shaft body 100 and to avoid the magnet of the magnet assembly 320 from falling out of the mounting slot 331.

Figure 48:
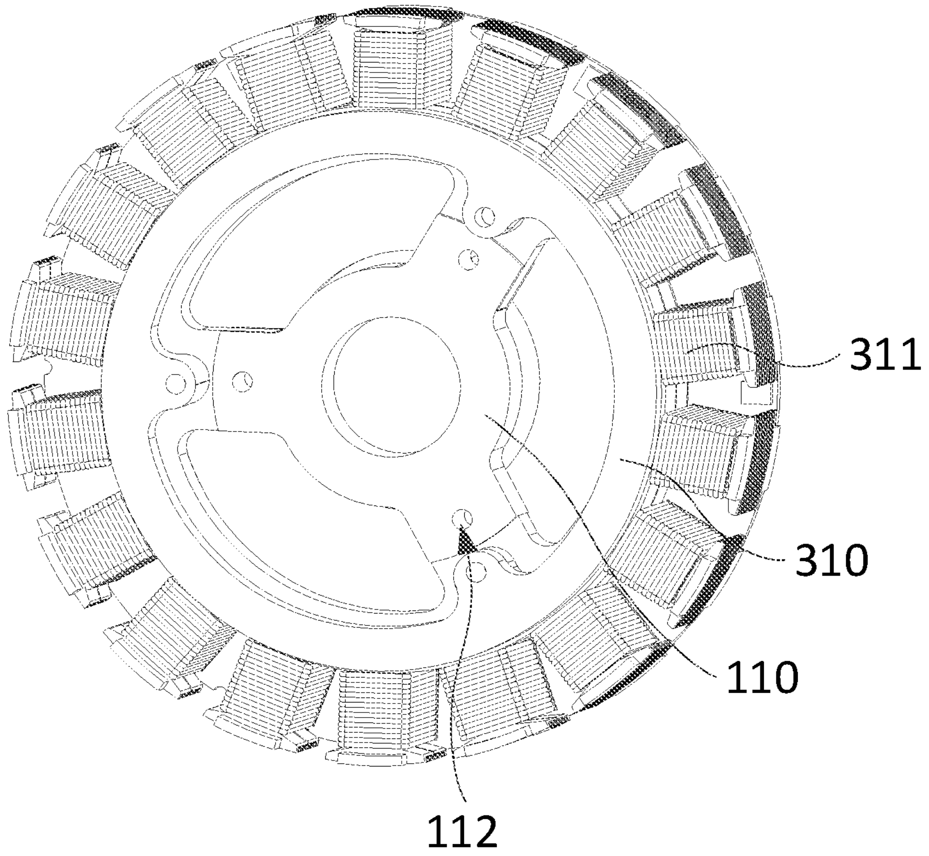
FIGS. 48-49 are schematic structural views of a brake apparatus according to a twelfth embodiment of the present disclosure.

Referring to FIG. 1, FIG. 2 and FIG. 48, the twelfth embodiment of the brake apparatus 10 of the present disclosure includes a shaft body 100, a housing 200, a magnetic inductor 310 and a magnet assembly 320, the housing 200 sleeved outside the shaft body 100 and configured coaxially with the shaft body 100, the housing 200 is rotatable relative to the shaft body 100, the magnetic inductor 310 has coils 311 wound thereon, the magnet assembly 320 includes a plurality of magnets spaced along the circumferential direction of the shaft body 100. One of the magnetic inductor 310 and the magnet assembly 320 is connected to the shaft body 100 and another one is connected to the housing 200, and the magnetic inductor 310 and/or the magnet assembly 320 is removably connected to the shaft body 100 or the housing 200, so that when the housing 200 rotates relative to the shaft body 100, the coils 311 are capable of cutting the magnetic field formed by the magnet assembly 320, thereby generating resisting force opposite to a rotation direction of the housing 200. In addition, the magnitude of resisting force can be changed by replacing the magnetic inductor 310 and/or the magnet assembly 320, which is able to adapt to the needs of different users and different environments, making the brake apparatus 10 more widely applicable.

In this embodiment, the brake apparatus 10 may further include a retainer 110 which is fixed on the shaft body 100. The magnetic inductor 310 is removably connected to the retainer 110 so that the magnetic inductor 310 can be removed from the shaft body 100 for replacement, and the number, size and arrangement structure of the magnets in the magnet assembly 320 can be changed to change the magnetic field generated by the magnet assembly 320, and then change the resisting force generated by the interaction of the magnetic inductor 310 and the magnet assembly 320 to achieve the adjustment of resisting force.

In this embodiment, the retainer 110 is provided with a first connection portion and the magnetic inductor 310 is provided with a second connection portion. The first connection portion engages with the second connection portion to connect the retainer 110 with the magnetic inductor 310, which can prevent the magnetic inductor 310 from rotating relative to the shaft body 100 during the rotation of the housing 200, making the interaction between the magnetic inductor 310 and the magnet assembly 320 more stable, and thus making the resisting force generated more stable.

Figure 49:
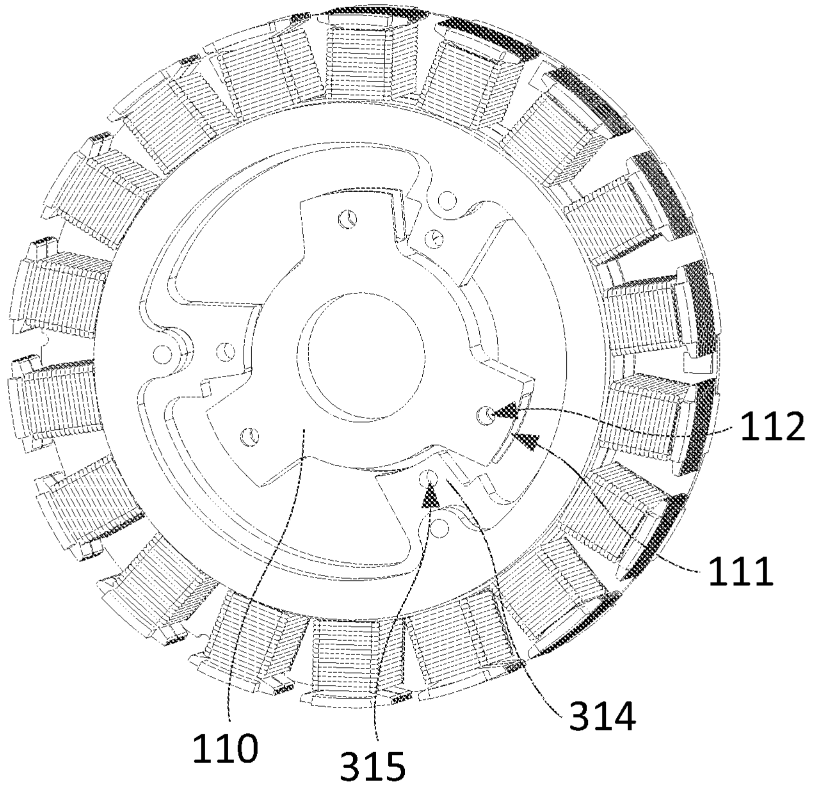

Referring to FIG. 49, in this embodiment, the first connection portion can be a connection groove 111, and the second connection portion can be a connection bulge 314. In addition, the connection bulge 314 is provided with a first connection hole 315 and the connection groove 111 is provided with a second connection hole 112, so as to fix them by a connection member (not shown in the figures) through the first connection hole 315 and the second connection hole 112 after the connection bulge 314 is matched and connected to the connection groove 111, which is simple in structure, easy to prepare, and highly reliable.

In this embodiment, the opening orientation of the connection groove 111 may be set parallel to the circumferential direction of the shaft body 100 to facilitate the snap of the magnetic inductor 310 with the retainer 110 after the magnetic inductor 310 is sleeved on the shaft body 100.

In other embodiments, the opening orientation of the connection groove 111 may also be set parallel to the axis direction of the shaft body 100 to facilitate the magnetic inductor 310 to snap directly to the retainer 110 along the axis direction of the shaft body 100.

In this embodiment, both the first connection hole 315 and the second connection hole 112 may be threaded holes, and the connection member may be a screw.

In other embodiments, the first connection portion may also be a connection bulge and the second connection portion may also be a corresponding connection groove, without limitation here.

In other embodiments, the retainer 110 and the magnetic inductor 310 may also be connected by other removable mechanisms such as snaps, which are not limited here.

In other embodiments, both the magnetic inductor 310 and the magnet assembly 320 may be of removable construction, as described in the eleventh and twelfth embodiments of the brake apparatus 10 above, and will not be limited herein.

Referring to FIG. 1 and FIG. 2, the first embodiment of the wheel body assembly of the present disclosure includes a brake apparatus 10, and the structure of the brake apparatus 10 is described in the above embodiments of the brake apparatus 10 and will not be repeated here.

The housing 200 of the brake apparatus 10 is set in a circular shape, which can be used as the wheel body of the wheel body assembly. The brake apparatus 10 can directly produce resisting force to the wheel body, so as to achieve the braking effect. Because the braking force is related to the rotation of the housing 200, rather than friction braking, it will not produce an emergency stop effect, which is safer and also can reduce wear and improve the service life of the brake apparatus 10. Meanwhile its structure is simple and easy to prepare.

Figure 50:
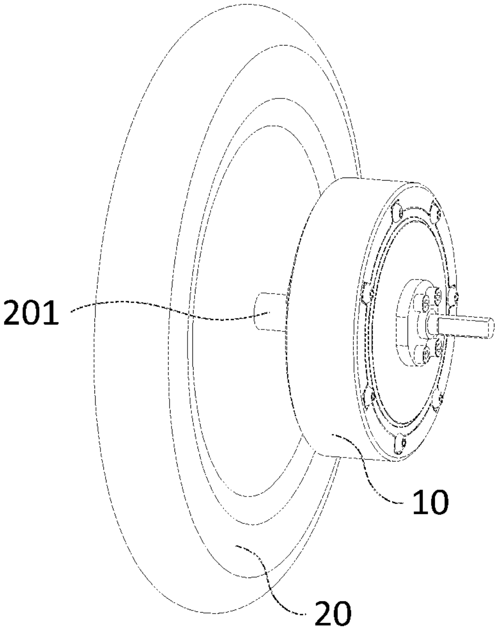
FIG. 50 is a schematic structural view of a wheel body assembly according to a second embodiment of the present disclosure.

Referring to FIG. 50, the second embodiment of the wheel body assembly of the present disclosure includes a brake apparatus 10 and a wheel body 20. The wheel body 20 is connected to the housing 200 or the shaft body 100 of the brake apparatus 10. The brake apparatus 10 generates resisting force to the wheel body by the housing 200 or the shaft body 100, so as to achieve the braking effect.

In this embodiment, the brake apparatus 10 may be removably connected with the wheel body 20, allowing the user to choose whether to install the brake apparatus 10 as required, which has a wider application.

In this embodiment, the brake apparatus 10 may be directly connected to the wheel body 20 by the connection rod 201 to directly achieve the braking effect on the wheel body 20.

In other embodiments, the brake apparatus 10 can also be connected to the wheel body 20 via a transmission device (not shown in the figures) to accommodate different braking needs and expand the range of application.

Figure 51:
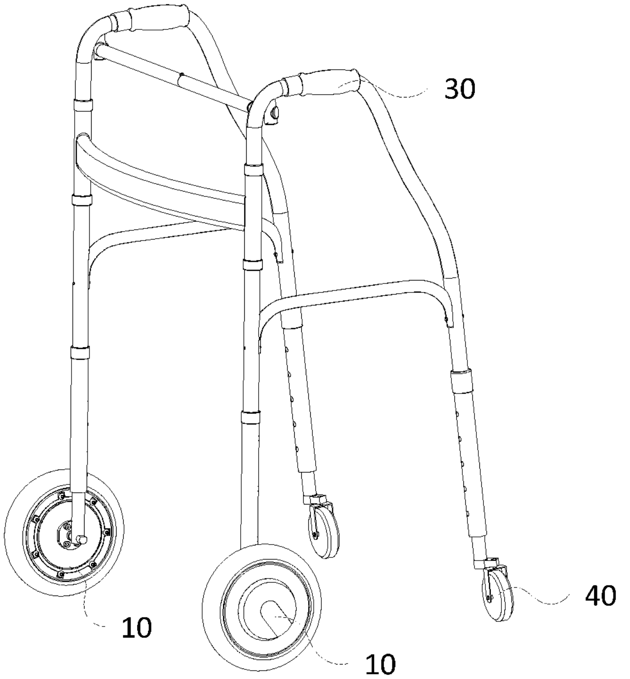
FIG. 51 is a schematic structural view of a rollator according to a first embodiment of the present disclosure.

Referring to FIG. 51, the first embodiment of the rollator of the present disclosure includes a brake apparatus 10 and a main frame 30. The brake apparatus 10 is rotatably connected to the bottom of the main frame 30 for moving with the main frame 30 and/or driving the movement of the main frame 30. In this embodiment, the number of brake apparatus 10 is two, and the brake apparatus 10 is used as the front wheels of the rollator. The rollator also includes two universal wheels 40 as the rear wheels. By using the brake apparatus 10 as the front wheels, it can make the steering operation of the rollator more effortless, and by using the universal wheels 40 as the rear wheels, it can facilitate the flexible rotation of the universal wheel 40 with the steering of the main frame 30.

In other embodiments, the two brake apparatus 10 may also be used as rear wheels (not shown in the figures), while the two universal wheels 40 are used as front wheels, which can avoid the problem of forward or sideways rollover caused by the excessive resisting force generated by the brake apparatus 10 instantaneously.

In other embodiments, the number of brake apparatus 10 may be four, i.e., not only used as the front wheels of the rollator, but also as rear wheels of the rollator, which can further improve the braking effect.

When the housing 200 of the brake apparatus 10 in this embodiment rotates relative to the shaft body 100, the coils 311 are capable of cutting the magnetic field formed by the magnet assembly 320, thus generating resisting force opposite to the rotation direction of the housing 200, which can play a braking role for the brake apparatus 10, and because the braking force is related to the rotation of the housing 200, rather than friction braking, it will not produce an emergency stop effect, which is more safer and also can reduce wear and improve the service life of the brake apparatus 10. Meanwhile its structure is simple and easy to prepare.

Figure 52:
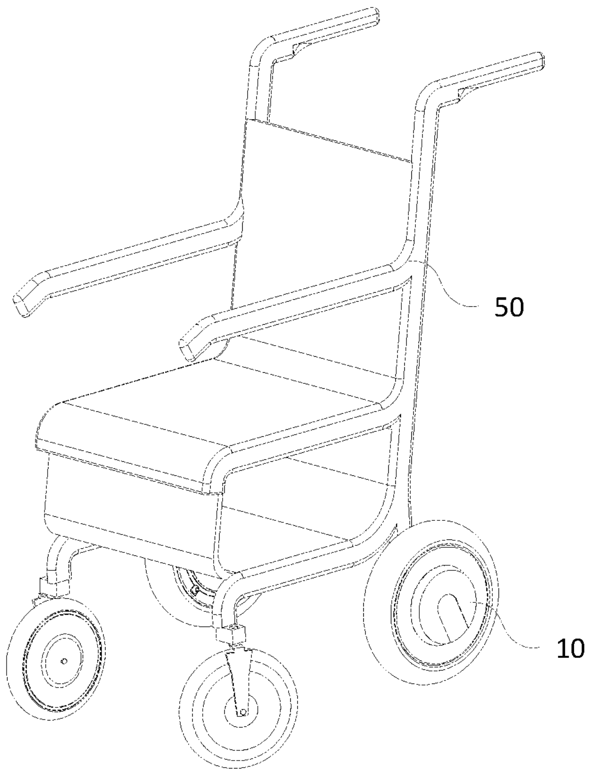
FIG. 52 is a schematic structural view of a rollator according to a second embodiment of the present disclosure.

Referring to FIG. 52, the second embodiment of the rollator of the present disclosure includes a brake apparatus 10 and a main frame 50. The brake apparatus 10 is rotatably connected to the bottom of the main frame 50 for moving with the main frame 50 and/or driving the movement of the main frame 50.

In this embodiment, the brake apparatus 10 can not only be used as the front wheels of the rollator, but also as the rear wheels of the rollator, as described above in the first embodiment of the rollator, and will not be repeated here.

When the housing 200 of the brake apparatus 10 in this embodiment rotates relative to the shaft body 100, the coils 311 are capable of cutting the magnetic field formed by the magnet assembly 320, thus generating resisting force opposite to the rotation direction of the housing 200, which can play a braking role for the brake apparatus 10, and because the braking force is related to the rotation of the housing 200, rather than friction braking, it will not produce an emergency stop effect, which is more safer and also can reduce wear and improve the service life of the brake apparatus 10. Meanwhile its structure is simple and easy to prepare.

In other embodiments, the brake apparatus 10 may also be used in other types of rollator and will not be limited here.

The above mentioned is only the implementation method of the present disclosure, and is not intended to limit the scope of the present disclosure. Any equivalent structure or equivalent process transformation using the contents of the specification and the accompanying drawings of the present disclosure, or any direct or indirect application in other related technical fields, is included in the protection scope of the present disclosure.

What is claimed is:

1. A brake apparatus, comprising:

a shaft body;

a housing, sleeved outside the shaft body and configured coaxially with the shaft body, the housing being rotatable relative to the shaft body;

a magnetic induction mechanism, arranged in the housing to generate resisting force opposite to a rotation direction of the housing to the housing or generate resisting force opposite to a rotation direction of the shaft body to the shaft body by a magnetic field reaction when the housing rotates relative to the shaft body; and an adjustment mechanism, connected to the magnetic induction mechanism for adjusting a magnitude of the resisting force;

wherein the adjustment mechanism comprises an adjustment member and at least one resistor, the adjustment member is electrically connected with the magnetic induction mechanism and is provided with a first connection portion, and one end of the at least one resistor is provided with a second connection portion, the adjustment member is capable of moving relative to the resistor, so that the first connection portion is capable of electrically connecting with the second connection portion.

2. The brake apparatus of claim 1, further comprising a first support pipe, wherein the at least one resistor is arranged on the first support pipe, the adjustment member is provided in a ring shape and capable of rotating relative to the first support pipe, the first connection portion is a groove formed on an outer circumference of the adjustment member, an outer circumference surface of the adjustment member is insulated except the groove, the groove is provided for electric conducting, the second connection portion comprises an abutting portion and a first elastic member, wherein the abutting portion is electrically connected with the resistor, the first elastic member is used to provide elasticity to the abutting portion, so that the abutting portion abuts the outer circumference of the adjustment member.

3. The brake apparatus of claim 2, wherein an annular groove is formed on the outer circumference of the adjustment member, the first connection portion is invaginated relative to the annular groove, and an end of the abutting portion is provided in an arc-shaped projection.

4. The brake apparatus of claim 2, further comprising a second support pipe and a knob connected with the second support pipe, wherein the second support pipe is embedded and sleeved in the first support pipe, and the adjustment member is arranged on the second support pipe, so that the adjustment member is capable of rotating with the knob.

5. The brake apparatus of claim 4, further comprising a shell, wherein the adjustment member and the resistor are arranged inside the shell, an opening is formed at one end of the shell away from the knob, the opening is polygonal in shape, the second support pipe is provided with a limit member and a second elastic member at one end away from the knob, the second elastic member is used to provide elasticity to the limit member, so that the limit member is capable of abutting against the shell during the rotation of the second support pipe.

6. The brake apparatus of claim 5, wherein the opening comprises a plurality of accommodating ports spaced along a circumferential direction of the first support pipe, when the limit member rotates to the accommodating port, a compression distance of the second elastic member is 0, so that the limit member is separated from the shell, or the limit member abuts against the shell and force acting on the shell is 0; when the limit member rotates between the two accommodating ports, the limit member abuts against the shell and force acting on the shell is greater than 0.

7. The brake apparatus of claim 1, further comprising a first support pipe, wherein the number of the resistor is multiple, and the multiple resistors form multiple resistor groups, each resistor group comprises at least three resistors, the least three resistors in each resistor group are located on the same plane perpendicular to an axis direction of the first support pipe, the multiple resistor groups are spaced along the axis direction of the first support pipe, the number of the adjustment member is multiple, which is the same as the number of the resistor groups, the multiple adjustment members are spaced along the axis direction of the first support pipe, corresponding to the resistor groups one by one respectively.

8. The brake apparatus of claim 1, wherein the adjustment mechanism comprises an adjustment member and at least one resistor, the adjustment member comprises at least one key, which is provided with a guiding connection portion, the brake apparatus further comprises a first connection portion and a second connection portion provided at intervals, the first connection portion and the second connection portion are electrically connected to two ends of the magnetic induction mechanism respectively, the at least one resistor is electrically connected to the first connection portion, when the key is pressed, the guiding connection portion is capable of making the first connection portion conduct to the second connection portion.

9. The brake apparatus of claim 8, wherein the adjustment member comprises at least two keys, which are provided with a guiding connection portion, the number of the first connection portion and the second connection portion is at least two, the two first connection portions are connected to two ends of the at least one resistor respectively, so that when one of the at least two keys is pressed, the guiding connection portion is capable of making one of the at least two first connection portions conduct to the corresponding second connection portion, the adjustment mechanism further comprises a rebound assembly, which is capable of acting on the at least two keys respectively, so that when one of the at least two keys is pressed, another key is capable of popping up.

10. The brake apparatus of claim 9, wherein the at least two keys are arranged at interval along a straight line or curve.

11. The brake apparatus of claim 8, wherein the key comprises a key body and a button arranged at one end of the key body, and the guiding connection portion is arranged at another end of the key body, the rebound assembly comprises a carrying plate and a first limit plate, the first limit plate is provided with a first limit slot which is L-shaped, the first limit plate comprises a limit portion corresponding to the first limit slot, a first elastic member is provided between the carrying plate and the first limit plate, a limit block is further provided on the key body, the limit block is used to cooperate with a first limit groove for limiting, a second elastic member is sleeved on an outside of the key body.

12. The brake apparatus of claim 11, wherein an accommodating slot is further provided on the first limit plate, and an abutting column is provided on the carrying plate, the first elastic member and the abutting column are placed in the accommodating slot, and the abutting column is used to abutting against the first elastic member; or the first elastic member further be provided at one end of the first limit plate to abut against an inner wall of the carrying plate.

13. The brake apparatus of claim 11, wherein a second limit slot is further provided on the carrying plate, and the limit block is placed in the second limit slot to fit the limit.

14. The brake apparatus of claim 11, wherein the rebound assembly further comprises a plurality of second limit plates, which are arranged sequentially along an extension direction of the first limit plate, and a third limit slot is provided between two adjacent second limit plates, the third limit slot is cooperated with the limit block for limiting.

15. The brake apparatus of claim 14, wherein the first limit plate is provided with an inclined surface corresponding to the first limit slot; and/or the second limit plate is provided with an inclined surface.

16. The brake apparatus of claim 1, wherein the adjustment mechanism comprises an adjustment member and at least one resistor, the adjustment member comprises at least one key, which is provided with a guiding connection portion, one end of the resistor is connected to one end of the magnetic induction mechanism via the first connection portion, and another end of the resistor is connected to another end of the magnetic induction mechanism via the second connection portion, the key is capable of pressing to make the guiding connection portion conduct the first connection portion to the second connection portion, thereby short circuiting the resistor.

17. The brake apparatus of claim 1, wherein the adjustment mechanism comprises a sensitive resistor; two ends of the sensitive resistor are electrically connected to two ends of the magnetic induction mechanism respectively.

18. A wheel body assembly, comprising:

the brake apparatus according to claim 1, wherein the housing is provided in a circular shape for use as a wheel body.

19. A rollator, comprising a main frame and the wheel body assembly according to claim 18, wherein the wheel body assembly is rotatably connected to a bottom of the main frame.

* * * * *